United States Patent
Torbatian et al.

(10) Patent No.: US 11,711,148 B2
(45) Date of Patent: Jul. 25, 2023

(54) 2D PROBALISTIC CONSTELLATION SHAPING USING SHELL MAPPING

(71) Applicant: Infinera Corporation, Sunnyvale, CA (US)

(72) Inventors: Mehdi Torbatian, Ottawa (CA); Han Henry Sun, Ottawa (CA); Kuang-Tsan Wu, Kanata (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/354,115

(22) Filed: Mar. 14, 2019

(65) Prior Publication Data

US 2020/0313773 A1 Oct. 1, 2020

Related U.S. Application Data

(60) Provisional application No. 62/643,113, filed on Mar. 14, 2018.

(51) Int. Cl.
*H04B 10/516* (2013.01)
*H04B 10/50* (2013.01)
(Continued)

(52) U.S. Cl.
CPC ......... *H04B 10/503* (2013.01); *H04B 10/516* (2013.01); *H04L 1/005* (2013.01);
(Continued)

(58) Field of Classification Search
CPC .............. H04B 10/516; H04B 10/5161; H04B 10/5561; H04L 27/3405
See application file for complete search history.

(56) References Cited

U.S. PATENT DOCUMENTS

| | | | |
|---|---|---|---|
| 9,900,105 B1* | 2/2018 | Batshon | H04B 10/556 |
| 9,929,813 B1* | 3/2018 | Batshon | H04B 10/516 |
| 2010/0178056 A1* | 7/2010 | Liu | H04B 10/614 |
| | | | 398/65 |

OTHER PUBLICATIONS

Buchali et al.; "Rate Adaptation and Reach Increase by Probabilistically Shaped 64-QAM: An Experimental Demonstration," in Journal of Lightwave Technology, vol. 34, No. 7, pp. 1599-1609, 1 Apr. 1, 2016, doi: 10.1109/JLT.2015.2510034 (Year: 2016).*

(Continued)

*Primary Examiner* — Nathan M Cors
(74) *Attorney, Agent, or Firm* — David L. Soltz

(57) ABSTRACT

Probabilistic constellation shaping (PCS) is applied to a desired probability distribution over the 2-D constellation points. Constellation points are partitioned into multiple disjoint sets in which all the constellation points within a subset have the same energy level (i.e., amplitude) or distance from the origin on the complex plane. Each of the sets may be further subdivided into smaller disjoint sets of constellation points to facilitate labeling of the constellation points. The sets may be indexed from 0 to the total number of disjoint sets to form an index set. The desired distribution may then be applied over the index set either using a distribution matcher (DM) or using a lookup table. The desired distribution may be generated before forward error correction (FEC) encoding that preserves the generated amplitude distribution through FEC encoding of data bits. The scheme may map the FEC encoded data bits to the constellation points, such that the probability of occurrence of each signal set (with a specific energy level) follows the desired probability distribution within a fixed codeword length. In addition, PCS can be applied to both square and non-square constellations, which may or may not be arranged on a Cartesian grid.

5 Claims, 19 Drawing Sheets

(51) Int. Cl.
  *H04L 1/00*      (2006.01)
  *H04L 27/34*     (2006.01)
  *H04L 27/36*     (2006.01)

(52) U.S. Cl.
  CPC ........ *H04L 1/0052* (2013.01); *H04L 27/3483* (2013.01); *H04L 27/363* (2013.01)

(56) References Cited

OTHER PUBLICATIONS

Fred Buchali et al., "Rate Adaptation and Reach Increase by Probabilistically Shaped 64-QAM: An Experimental Demonstration", Journal of Lightwave Technology, vol. 34, Issue: 7, Apr. 1, 1 2016, pp. 1599-1609.

\* cited by examiner

Table 1

| Shell 0 | | Shell 1 | | Shell 2 | | Shell 3 | |
|---|---|---|---|---|---|---|---|
| Point | Label | Point | Label | Point | Label | Point | Label |
| -3 - 3i | '0000' | -3 - 1i | '0001' | -1 - 3i | '0100' | -1 - 1i | '0101' |
| -3 + 3i | '0010' | -3 + 1i | '0011' | -1 + 3i | '0110' | -1 + 1i | '0111' |
| 3 - 3i | '1000' | 3 - 1i | '1001' | 1 - 3i | '1100' | 1 - 1i | '1101' |
| 3 + 3i | '1010' | 3 + 1i | '1011' | 1 + 3i | '1110' | 1 + 1i | '1111' |

| Shell 0 | |
|---|---|
| Point | Label |
| -7 - 7i | '000000' |
| -7 + 7i | '100000' |
| 7 - 7i | '000100' |
| 7 + 7i | '100100' |

| Shell 1 | |
|---|---|
| Point | Label |
| -7 - 5i | '000001' |
| -7 + 5i | '100001' |
| 7 - 5i | '000101' |
| 7 + 5i | '100101' |

| Shell 2 | |
|---|---|
| Point | Label |
| -7 - 1i | '000010' |
| -7 + 1i | '100010' |
| 7 - 1i | '000110' |
| 7 + 1i | '100110' |

| Shell 3 | |
|---|---|
| Point | Label |
| -7 - 3i | '000011' |
| -7 + 3i | '100011' |
| 7 - 3i | '000111' |
| 7 + 3i | '100111' |

| Shell 4 | |
|---|---|
| Point | Label |
| -5 - 7i | '001000' |
| -5 + 7i | '101000' |
| 5 - 7i | '001100' |
| 5 + 7i | '101100' |

| Shell 5 | |
|---|---|
| Point | Label |
| -5 - 5i | '001001' |
| -5 + 5i | '101001' |
| 5 - 5i | '001101' |
| 5 + 5i | '101101' |

| Shell 6 | |
|---|---|
| Point | Label |
| -5 - 1i | '001010' |
| -5 + 1i | '101010' |
| 5 - 1i | '001110' |
| 5 + 1i | '101110' |

| Shell 7 | |
|---|---|
| Point | Label |
| -5 - 3i | '001011' |
| -5 + 3i | '101011' |
| 5 - 3i | '001111' |
| 5 + 3i | '101111' |

| Shell 8 | |
|---|---|
| Point | Label |
| -1 - 7i | '010000' |
| -1 + 7i | '110000' |
| 1 - 7i | '010100' |
| 1 + 7i | '110100' |

| Shell 9 | |
|---|---|
| Point | Label |
| -1 - 5i | '010001' |
| -1 + 5i | '110001' |
| 1 - 5i | '010101' |
| 1 + 5i | '110101' |

| Shell 10 | |
|---|---|
| Point | Label |
| -1 - 1i | '010010' |
| -1 + 1i | '110010' |
| 1 - 1i | '010110' |
| 1 + 1i | '110110' |

| Shell 11 | |
|---|---|
| Point | Label |
| -1 - 3i | '010011' |
| -1 + 3i | '110011' |
| 1 - 3i | '010111' |
| 1 + 3i | '110111' |

| Shell 12 | |
|---|---|
| Point | Label |
| -3 - 7i | '011000' |
| -3 + 7i | '111000' |
| 3 - 7i | '011100' |
| 3 + 7i | '111100' |

| Shell 13 | |
|---|---|
| Point | Label |
| -3 - 5i | '011001' |
| -3 + 5i | '111001' |
| 3 - 5i | '011101' |
| 3 + 5i | '111101' |

| Shell 14 | |
|---|---|
| Point | Label |
| -3 - 1i | '011010' |
| -3 + 1i | '111010' |
| 3 - 1i | '011110' |
| 3 + 1i | '111110' |

| Shell 15 | |
|---|---|
| Point | Label |
| -3 - 3i | '011011' |
| -3 + 3i | '111011' |
| 3 - 3i | '011111' |
| 3 + 3i | '111111' |

| Index | Label | Shell combination indexes | | |
|---|---|---|---|---|
| 0 | '00000' | 1 | 1 | 1 |
| 1 | '00001' | 1 | 1 | 2 |
| 2 | '00010' | 1 | 1 | 3 |
| 3 | '00011' | 1 | 2 | 1 |
| 4 | '00100' | 1 | 2 | 2 |
| 5 | '00101' | 1 | 2 | 3 |
| 6 | '00110' | 1 | 3 | 1 |
| 7 | '00111' | 1 | 3 | 2 |
| 8 | '01000' | 1 | 3 | 3 |
| 9 | '01001' | 2 | 1 | 1 |
| 10 | '01010' | 2 | 1 | 2 |
| 11 | '01011' | 2 | 1 | 3 |
| 12 | '01100' | 2 | 2 | 1 |
| 13 | '01101' | 2 | 2 | 2 |

| Index | Label | Shell combination indexes | | |
|---|---|---|---|---|
| 14 | '01110' | 2 | 2 | 3 |
| 15 | '01111' | 2 | 3 | 1 |
| 16 | '10000' | 2 | 3 | 2 |
| 17 | '10001' | 2 | 3 | 3 |
| 18 | '10010' | 3 | 1 | 1 |
| 19 | '10011' | 3 | 1 | 2 |
| 20 | '10100' | 3 | 1 | 3 |
| 21 | '10101' | 3 | 2 | 1 |
| 22 | '10110' | 3 | 2 | 2 |
| 23 | '10111' | 3 | 2 | 3 |
| 24 | '11000' | 3 | 3 | 1 |
| 25 | '11001' | 3 | 3 | 2 |
| 26 | '11010' | 3 | 3 | 3 |

1500

1602

| First symbol | Second symbol |
|---|---|
| 1 | 1 |
| 1 | 2 |
| 1 | 3 |
| 2 | 1 |
| 2 | 2 |
| 2 | 3 |
| 3 | 1 |
| 3 | 2 |
| 3 | 3 |

| SE | | | |
|---|---|---|---|
| SE = 2 | (3,3) | p(3) = 1; p(2) = 0; p(1) = 0 | Pavg = 2 |
| SE = 2.5 | (3,3), (3,2) | p(3) = 3/4; p(2) = 1/4; p(1) = 0 | Pavg = 4 |
| SE = 3 | (3,3), (3,2), (3,1), (2,3) | p(3) = 5/8; p(2) = 2/8; p(1) = 1/8 | Pavg = 5 |
| SE = 3.5 | (3,3), (3,2), (3,1), (2,3), (2,2), (2,1), (1,3), (1,2) | p(3) = 6/16; p(2) = 6/16; p(1) = 4/16 | Pavg = 7 |

Fig. 17a

| SE = 3 | (3,1), (3,2), (1,3), (2,3) | p(3) = 5/8; p(2) = 2/8; p(1) = 1/8 | Pavg = 6 |
|---|---|---|---|

2D PROBALISTIC CONSTELLATION SHAPING USING SHELL MAPPING

This application claims priority under 35 U.S.C. § 119 to U.S. Provisional Patent Application No. 62/643,113, filed on Mar. 14, 2018, the entire content of which is incorporated by reference herein in its entirety.

Optical communication systems are known in which data is carried over amplitude/phase modulated optical signals that are transmitted along an optical fiber link to a receiver node. Such optical signals may be transmitted in accordance with a variety of standard modulation formats using polarization multiplexing (also known as dual polarization), such as binary phase shift keying (BPSK), 3-quadrature amplitude modulation (3-QAM), quadrature phase shift keying (QPSK, or 4-QAM), 8-QAM, 16-QAM, 32-QAM, and 64-QAM, with fixed spectral efficiency (SE) of 2, 3, 4, 6, 8, 10, and 12 b/dual-pol-symbol, respectively. These modulation formats are uniformly distributed, such that transmission of each symbol, each of which having a corresponding constellation point, is equally probable. Put another way, the probability of any signal point of the constellation or constellation point is the same as the probability of occurrence of any other signal point of the constellation.

For communication systems in which symbols are transmitted in accordance with uniform discrete signal constellations, the required signal power to noise power ratio (SNR) for error free communication is normally away from the Shannon limit regardless of the strength of the employed forward error correction (FEC). This gain loss, which increases at higher spectral efficiency, reaches to up to 1.53 dB for a n-dimensional (n-D) cube constellations, which are square constellations expaned over n complex dimensions, as n goes to infinity.

Optical signals or channels may be transmitted along optical fiber that constitute at least part of an optical communication path. The noise associated with such path has been determined in many instances to be Gaussian in nature, and such noise has been termed additive white Gaussian noise (AWGN) in a linear power limited regime. Optimal capacity for optical signals propagating in an AWGN channel has been achieved with Gaussian probability distributions in which transmission probability of symbols (and their corresponding constellation points) correspond to a Gaussian distribution. Such Gaussian probability distributions are not uniform and are therefore different from the uniform distribution that normally exists on the standard modulation formats noted above.

For a given optical fiber path distance and at a desired SNR margin from the forward error correction (FEC) threshold, there is an optimal SE for which the transmission rate is maximized. Typically, however, such optimal SE cannot be achieved with the standard modulation formats noted above, because the fixed SEs with coarse granularities associated with such modulation formats may either be too high or too low for the link. Thus, the deployed transmission data rate on the link is normally less than what the link ideally can carry.

An alternative approach to minimize the gain loss due to non-ideal input distribution is referred to as constellation shaping. In constellation shaping, the signal space is encoded such that the distribution of the projection of the n-D constellation on each of the real and the imaginary dimensions of the constellation follows a desired probability distribution, which may be Gaussian. In probabilistic constellation shaping, the input information data bits are encoded such that when they are mapped to a specific 2-D constellation, the probability of occurrence of each of the constellation points follows a desired probability distribution. In other words, unlike standard modulation formats, in which symbols associated with each constellation point are transmitted with equal probability, in probabilistic shaping, certain symbols associated with particular constellation points are transmitted more frequently, i.e., have a higher likelihood or probability of transmission, compared to other symbols corresponding to other constellation points. It has been shown that probabilistic constellation shaping may be able to recover the shaping gain that is lost when standard uniform modulation formats are deployed.

A given spectral efficiency (SE) may be associated with a specific probability distribution for a corresponding constellation. Thus, different SEs may be obtained by changing the probability distribution. This is equivalent to designing a single circuit to accommodate many different modulation formats to approximate the Shannon capacity limit for a given link. Thus, in addition to improved SNR gain, probabilistic constellation shaping provides a mechanism to finely tune the SE to maximize the transmission data rate over a communication link at a fixed desired SNR margin.

Conventional probabilistic constellation shaping may only be employed in connection with square constellations, such as constellations associated 16/64/256/1024 quadrature amplitude modulations (QAM). However, in order to achieve desired spectral efficiencies (SEs) with probabilistic constellation of such square-shaped constellation, relatively large constellations should be deployed with correspondingly long codewords. For example, for SE values greater than two and less than three ($2<SE<3$), the smallest square constellation that can support this range of spectral efficiency is 16 QAM while a proper 12 QAM or even a proper 8 QAM non-square constellation can theoretically achieve the same shaping gain with less implementation complexity. Moreover, using oversized constellations results in a relatively high peak power of the constellation, which, accordingly, deteriorates or increases the peak to average power ratio of the resulting signal.

Moreover, using a large size constellation along binary labeling may limit the choice of the best probability distribution corresponding to the desired SE. This may increase the average constellation power at a fixed given minimum distance between the points, and, therefore, may reduce the average SNR tolerance of the constellation.

In addition, conventional probabilistic constellation shaping ("PCS") requires that constellation points be located on a two-dimensional (2-D) Cartesian grid, as I and Q channels that are processed independently. However, PCS typically may not be applied to many other non-square constellation configurations, such as circular configurations.

For high data rate systems, where parallel processing of input data sequence may be required, separate I and Q channel processing for PCS encoding and decoding may increase the implementation complexity on the transmit side of a communication system.

Accordingly, there is a need for an optical communication system in which PCS may be employed in connection with non-square constellations, as well as constellations that are not arranged on a Cartesian grid. This is necessary to choose the best constellation size and best constellation shape to obtain the best performance of PCS for a specific SE value.

SUMMARY

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 2 shows a table listing binary labels associated with the constellation points shown in FIG. 1.

FIG. 13 illustrates a table listing constellation points and corresponding labels in connection with the constellation shown in FIG. 12;

FIG. 12 shows another constellation consistent with the present disclosure;

FIG. 13 illustrates a table listing constellation points and labels in connection with the constellation shown in FIG. 12;

FIG. 15 illustrates a table listing labels of the corresponding combinations of shell indexes consistent with the present disclosure;

FIG. 16b shows a look-up table consistent with a further aspect of the present disclosure;

FIGS. 17a and 17b show tables that list spectral efficiencies, and average powers associated with various shell combinations consistent with the present disclosure.

DESCRIPTION OF THE EMBODIMENTS

Figure 1:
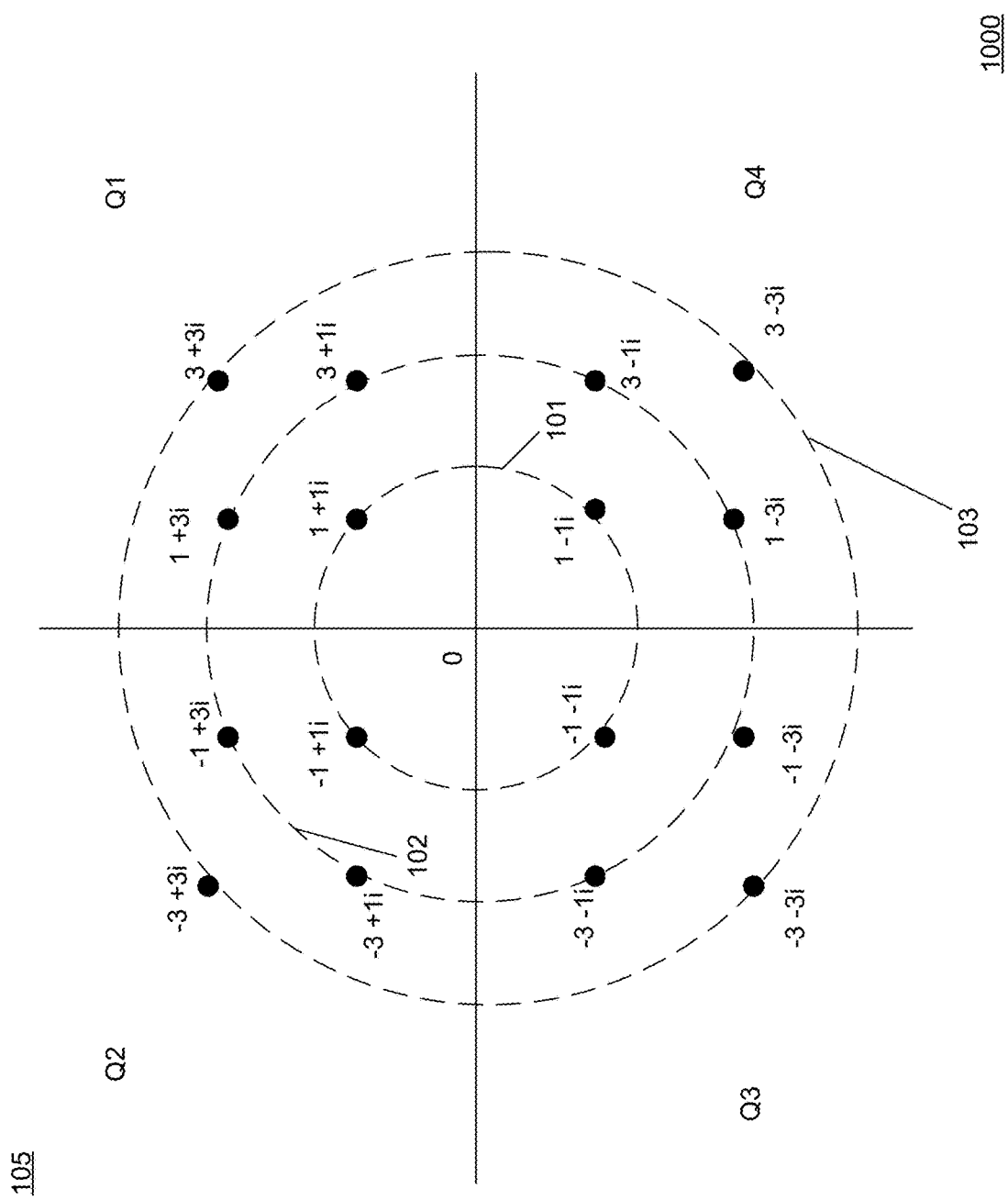
FIG. 1 illustrates a partitioned constellation consistent with an aspect of the present disclosure.

As noted above, in (PCS), the input bit sequence is mapped to a predetermined constellation (component constellation) with fixed cardinality, such that the constellation points are selected according to a desired probability distribution. Conventional PCS algorithms perform the shaping on the in-phase (I) and quadrature (Q) components of each symbol separately. Thus, constellations are limited to square QAM configurations or signal sets which may not be optimum for a desired spectral efficiency. Moreover, amplitude variation of the constructed shaped signal cannot be adequately controlled by separate I and Q processing does. Such control is of great interest in some communication scenarios such as fiber optic channels.

Consistent with the present disclosure, however, PCS is applied to a desired probability distribution over the 2-D constellation points. Constellation points are partitioned into multiple disjoint sets in which all the constellation points within a subset have the same energy level (i.e., amplitude) or distance from the origin on the complex plane. Each of the sets may be further subdivided into smaller disjoint sets of constellation points to facilitate labeling of the constellation points. The sets may be indexed from 0 to the total number of disjoint sets to form an index set. The desired distribution may then be applied over the index set either using a distribution matcher (DM) or using a lookup table. The desired distribution may be generated before forward error correction (FEC) encoding. However, a signaling scheme is provided to preserve the generated amplitude distribution through FEC encoding of data bits. For example, the scheme may map the FEC encoded data bits to the constellation points such that the probability of occurrence of each signal set (with a specific energy level) follows the desired probability distribution within a fixed codeword length. As opposed to conventional, PCS schemes which are based on separate or one-dimensional processing of I and Q components, amplitude variation of the shaped signal can be controlled. In addition, PCS can be applied to both square and non-square constellations, which may or may not be arranged on a Cartesian grid. Accordingly, a constellation having an appropriate size and shape may be selected to provide a desired spectral efficiency using PCS.

Consistent with a further aspect of the present disclosure, PCS may be implemented either in long length codewords using a distribution matching (DM) algorithms, or in short length codewords using lookup tables. DM matching may be employed when large DM codewords is selected to precisely provide a desired SE at the optimal average power of the resulted constellation. If such performance is not required, however, PCS based on values stored in a short look-up table may be provided to yield a less complex solution, but with reduced performance, e.g., an SE that may not be optimal.

Consistent with an additional aspect of the present disclosure, a desired probability distribution can be provided that matches the channel or transmission path statistics, such as minimizing average power, maximizing achievable data rates, and optimizing the input symbol distribution for a specific channel impairment such as a fiber non-linearity effect.

As opposed to conventional schemes, PCS consistent the present disclosure may be applied to data bits and the labeling is carried out to preserve shaping through the FEC, thereby minimizing any effects on commercial communication systems.

Reference will now be made in detail to the present exemplary embodiments of the present disclosure, which are illustrated in the accompanying drawings. Wherever possible, the same reference numbers will be used throughout the drawings to refer to the same or like parts.

The present disclosure is organized as follows: Section 1—Description 2-D PCS consistent with the present disclosure; Section 2—Description of an optical communication system incorporating and encoder and decoder consistent with the present disclosure; Section 3—Labelling of Non-Cartesian Constellations; and Section 4—PCS Employing A Look-Up Table.

Section 1—Description of 2-D PCS

FIG. 1 illustrates an example of a 16 QAM constellation 1000. Constellation 1000 includes a plurality of constellation points labelled 0010, 0010, etc. Each of these points corresponds to a transmitted symbol. The points shown in FIG. 1 may be partitioned into disjoint sets or "shells", whereby each shell includes points that have the same energy, i.e., are provided the same distance from origin 0 of the complex plane 105. Each shell, in this example, further includes four points, such that each point is provided in a respective one of quadrants Q1, Q2, Q3, and Q4 of complex plane 105. For example, a first shell, in this example, includes constellation points (as represented by complex numbers) 1+1i (in quadrant Q1), −1+1i (in quadrant Q2), −1−1i (in quadrant Q3), and 1−1i (in quadrant Q4). Each of these points is provided along dashed line 101 (or energy level), which is drawn as a circle about origin 0. Accordingly, each of these points has the same energy. Similarly, constellation points 1+3i, −1+3i, −1−3i, and 1−3i constitute a second shell, whereby each point is provided in a respective one of quadrants Q1, Q2, Q3, and Q4, and each such point is equidistant from origin 0 and has energy level 102. Moreover, a third shell, in this example, includes points 3+1i (Q1), −3+1i (Q2), −3−1i (Q3), and −3+1i (Q4) also has energy 102, and a fourth shell also includes equidistant or equal-energy points 3+3i (Q1), −3+3i (Q2), −3−3i (Q3), 3−3i (Q4) about origin 0 at energy level 103.

Once partitioned, each constellation point is preferably labeled or assigned a unique binary gray code (i.e., the code of each point in the constellation differs by one bit). Table 1 shown in FIG. 2 lists the constellation points as complex numbers and a binary label corresponding to each point. Bit positions 1 and 3 within each label designate a particular shell, and bit position 2 and 4 in each label designate the I and Q dimensions, respectively, of the constellation point. Accordingly, for example, point 3-1i of Shell 1 is represented by label 1001. The bits at positions 1 (having a value of 0) and 3 (having a value of 1) of this label designate Shell 1, and bits at positions 0 (having a value 1) and 2 (having a value of 0) designate the I and Q values associated with the particular constellation point 3-1i. It is noted that the labels of the other points in shell 1 also having the same bit values at label bit positions 1 and 3, which in this example, are 0 and 1, respectively. As further indicated in Table 1, the bits at positions 1 and 3 of the constellation point labels of shell 0 are both 0, and the bits at positions 1 and 3 of the constellation point labels of shell 2 are 1 and 0, respectively. Lastly, the bits at positions 1 and 3 of the constellation point labels of shell 3 are both 1. Thus, as noted above, bit values at positions 1 and 3 of each label designate a particular shell or amplitude, and the bit values at positions 0 and 2 designate the I and Q values associated with a particular constellation point within that shell. Put another way, bits at positions 1 and 3 (as numbered from the leftmost bit position) of each label correspond to a shell index or binary index of each shell.

Figure 6:
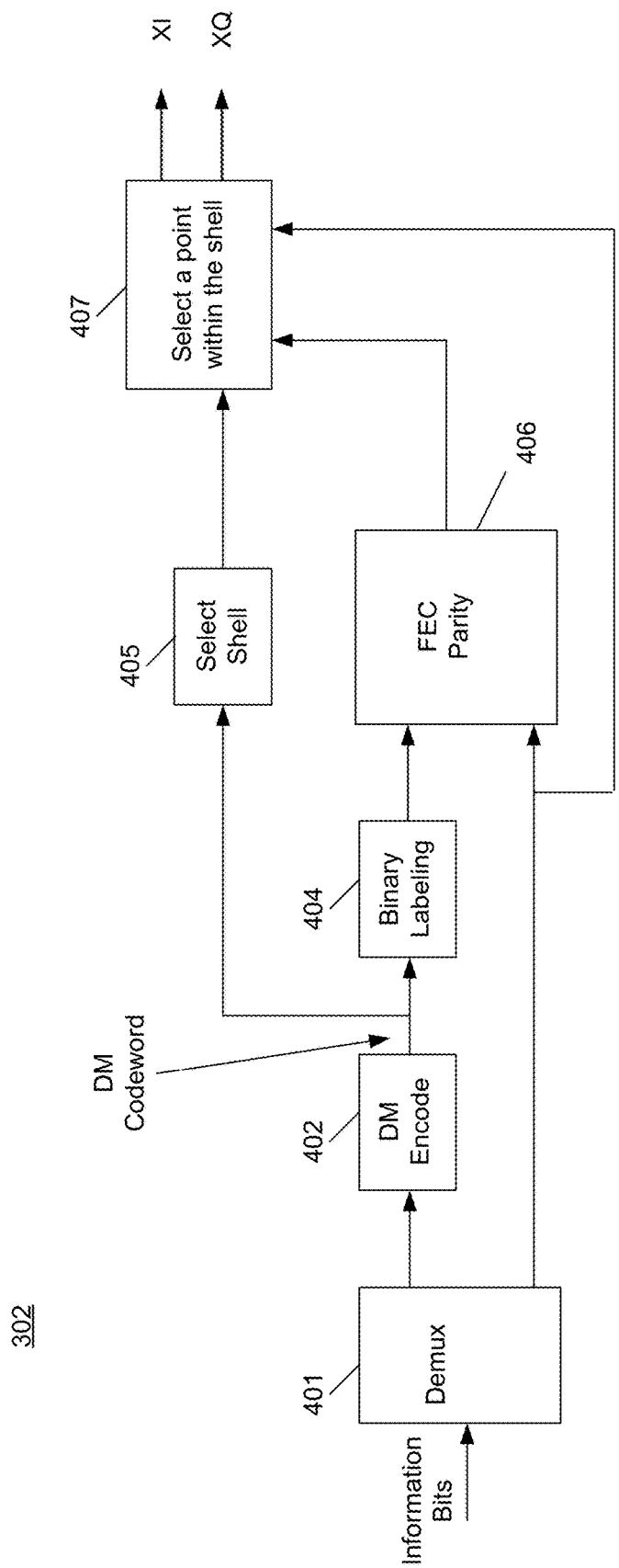
FIG. 6 illustrates features of an encoder circuit consistent with a further aspect of the present disclosure.

As discussed in greater detail with respect to FIG. 6, incoming information bits are PCS or distribution matching (DM) encoded and, such encoded bits are used to generate the constellation point labels noted above. These labels are FEC encoded and, based on the encoded labels, symbols are addressed which are then transmitted to a receiver. As discussed in greater detail with reference to FIG. 11, the received signals are de-mapped and decoded to recover the information bits.

Figure 3:
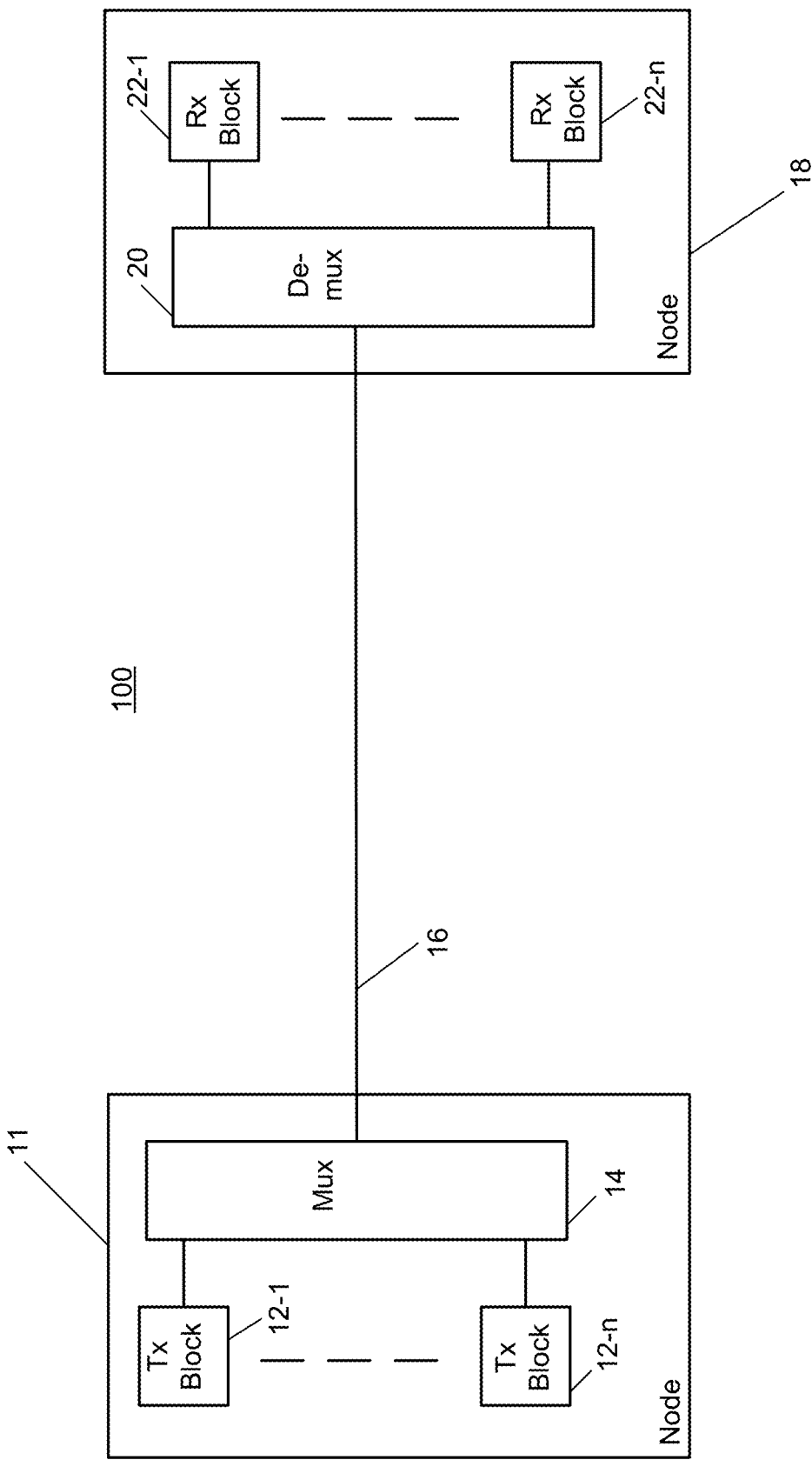
FIG. 3 illustrates a block diagram of an optical communication system consistent with the present disclosure.

Section 2—Description of an Optical Communication System Incorporating and Encoder and Decoder Consistent with the Present Disclosure FIG. 3 illustrates an optical link of optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams or input sequences Data-1 to Data-n. Multiplexer 14, which may include one or more optical filters, for example, combines each of group of optical signals onto optical communication path 16. Optical communication path 16 may include one or more segments of optical fiber and optical amplifiers, for example, to optically amplify or boost the power of the transmitted optical signals.

As further shown in FIG. 3, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 4:
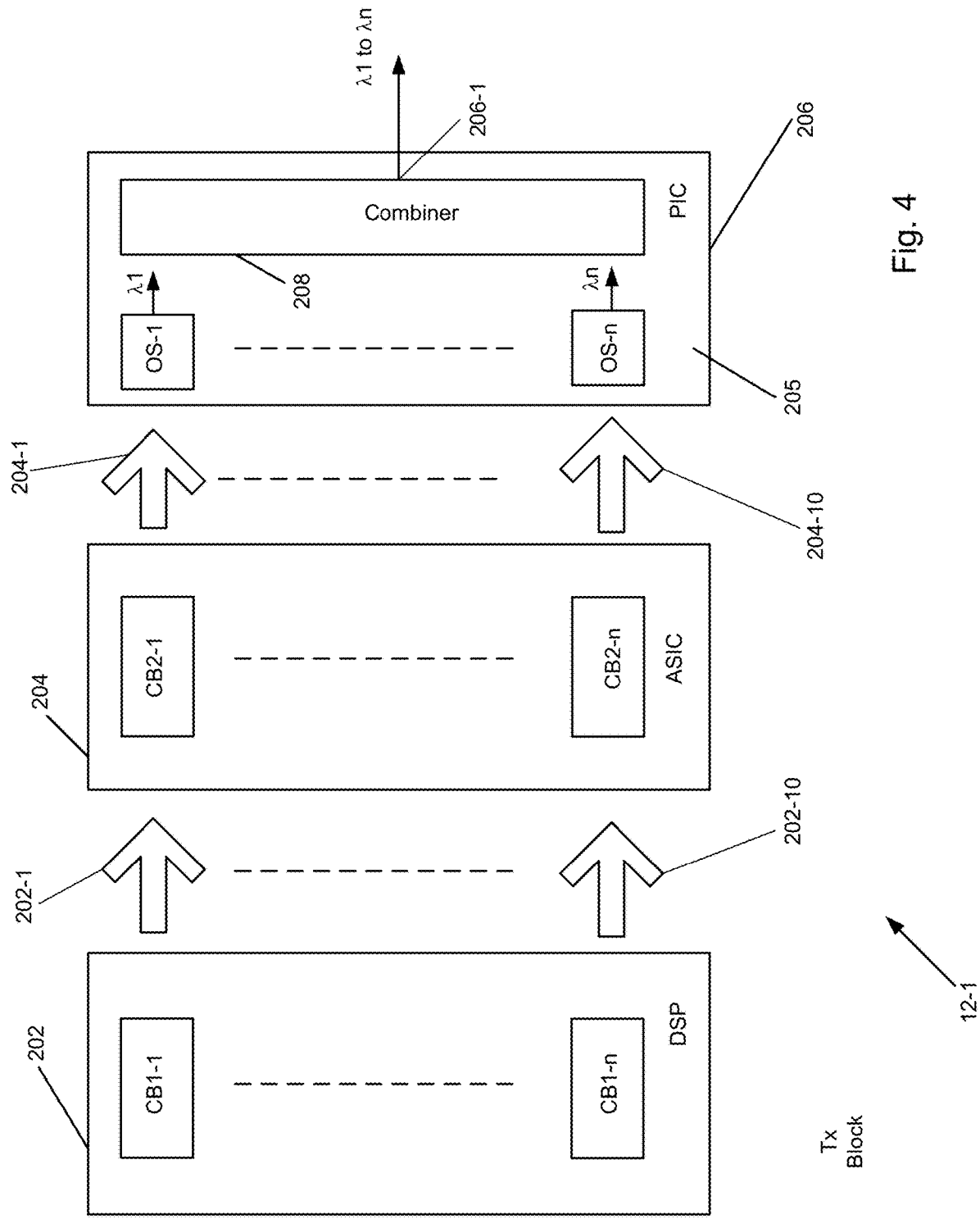
FIG. 4 illustrates a diagram of a transmit block, including a transmission circuit, consistent with an additional aspect of the present disclosure.

FIG. 4 illustrates one of transmitter blocks 12-1 in greater detail. Transmitter block 12-1 may include a digital signal processor (DSP) 202 including circuitry or circuit blocks CB1-1 to CB1-n, each of which receiving, for example, a corresponding portion of Data-1 and supplying a corresponding one of outputs or electrical signals 202-1 to 202-n to a circuit, such as application specific integrated circuit (ASIC) 204. ASIC 204 include circuit blocks CB2-1 to CB2-n, which supply corresponding outputs or electrical signals 204-1 to 204-n to optical sources or transmitters OS-1 to OS-2 provided on transmit photonic integrated circuit (PIC) 205. As further shown in FIG. 4, each of optical sources OS-1 to OS-2 supplies a corresponding one of modulated optical signals having wavelengths $\lambda 1$ to $\lambda 10$, respectively. The optical signals are combined by an optical combiner or multiplexer, such as arrayed waveguide grating (AWG) or power combiner 208, for example, and combined into a band or group of optical signals supplied by output 206-1. Optical sources OS-1 to OS-n and multiplexer 208 may be provided on substrate 205, for example. Substrate 205 may include indium phosphide or other semiconductor materials. It is understood, that optical sources OS-1 to OS-n, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices. In addition, components and/or devices in each of circuit blocks CB1, CB2, and optical sources OS and combiner 208 may be integrated with one or more of such components and/or devices or may be provided as discrete devices or components.

DSP and ASIC 202 may collectively constitute a transmission circuit that supplies drive signals (electrical signals) to the modulators in optical source OS-1 as well as the remaining optical sources.

Figure 5:
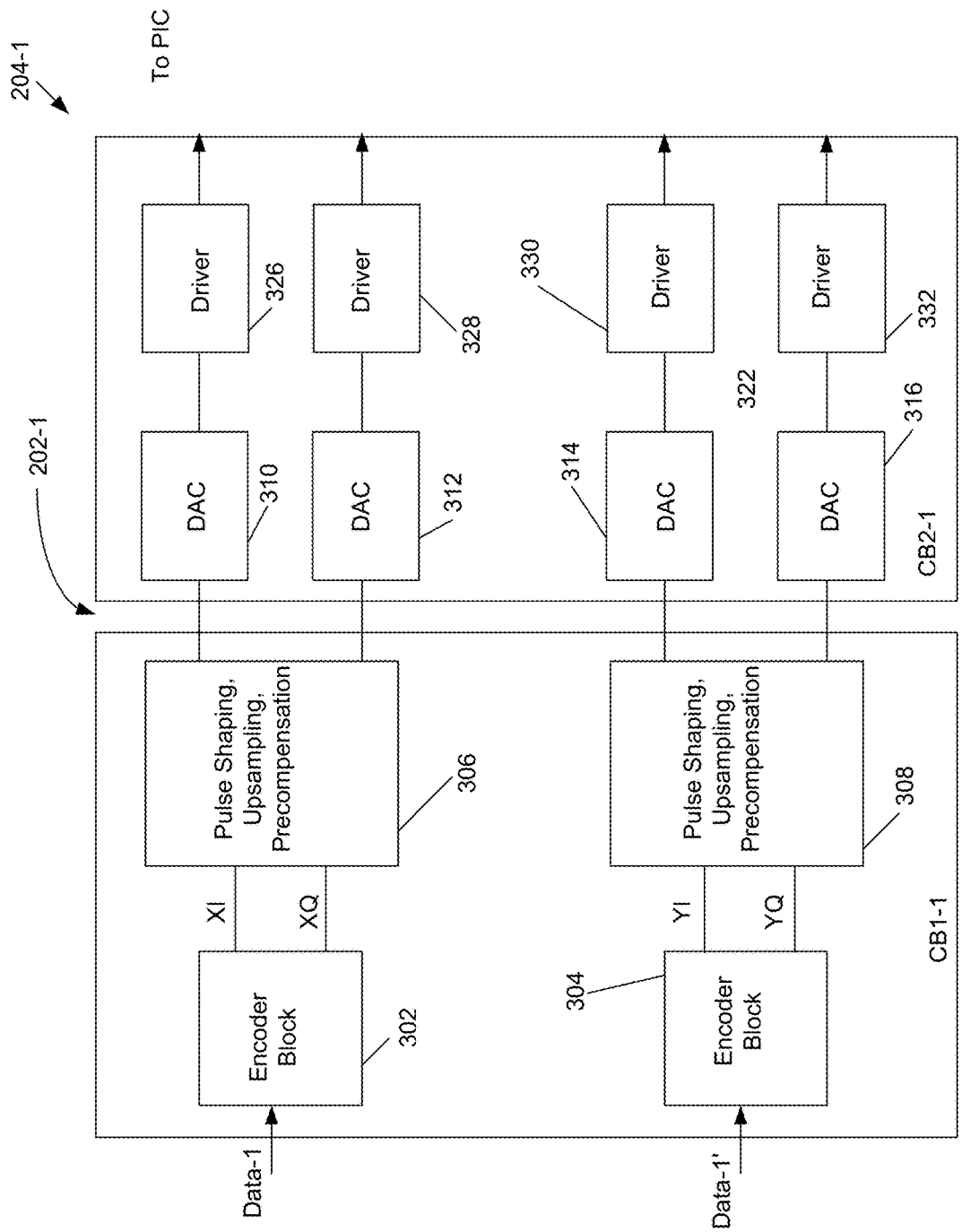
FIG. 5 illustrates features of a digital signal processor and application specific integrated circuit consistent with an aspect of the present disclosure.

FIG. 5 illustrates a portion of transmission circuit 1, namely, circuit block CB1-1 of DSP 202 in greater detail.

Circuit block CB-1 includes an encoder block 302 that supplies in-phase (XI) and quadrature (XQ) symbols for modulating the X (or transverse electric—TE) polarization of the transmitted optical signal.

Encoder block 302 is shown in greater detail in FIG. 6. Encoder block 302 includes a demultiplexer 401 that receives input information bits. Some of the bits are supplied to a DM encoder 402, which supplies a codeword based on the received bits, while remaining bits fed to demultiplexer 401 are supplied to a FEC encoder or parity circuit 406. DM encoder circuit 402 may be the same as or similar to distribution matching or PCS circuitry described in U.S. patent application Ser. No. 16/152,353 filed on Oct. 4, 2018, the entire contents of which are incorporated by reference herein. By way of further explanation, for a desired probability distribution or frequency count model of the energy levels of a constellation and for a fixed DM codeword length n, the probability distribution is quantized within the codeword length to obtain the frequency count of occurrence of each energy level. Put another way, the bits of the codeword output from DM encoder 402 indicate a probability that a constellation point or symbol output from encoder circuit 302 has a given energy level. For those energy levels that are further partitioned to smaller sets or shells, the probability of the energy level is uniformly distributed between such shells.

For example, in the example constellation shown in FIG. 1, DM encoder 402 supplies codewords that indicate a probability that a constellation point or symbol output from encoder circuit 302 has one of energy levels 101, 102, and 103. In one example, the codeword may indicate a higher first probability that the constellation points will have energy level 101, and a second lower probability that the constellation points will have energy level 102. In addition, the codewords may indicate yet a lower third probability, less than the second probability, that the constellation points will have energy level 103. As further noted above, two shells (the first including points 1+3i, −1+3i, −1−3i, and 1−3i, and the second including points 3+1i, −3+1i, −3−1i, and 3−i1) have the same energy level 102. According, the constellation points associated with energy level may be assigned an equal probability that such points are within the first shell or the second shell.

Assuming that the constellation has been partitioned to M sets, the frequency count of the i-th set is $n_i$, such that $\Sigma_{i=0}^{M-1} n_i = n$. Having a frequency count model for the shells of the constellation, DM encoder 402 maps the input information bits to the index set of the constellation shells according to the desired frequency count model or probability, as noted above. Thus each DM codeword represents or corresponds to a sequence of shell indexes with the empirical distribution that corresponds to that of the frequency count model.

Each entry or subsequence of bits of the DM codeword corresponds to one of the shells which includes a complete power of 2 number of constellation points. Thus, a proper number of bits from the sequence of information bits (or from the parity check bits from the FEC circuit 406 discussed below) can address a unique point within the selected shell. Accordingly, the constellation points are selected according to the desired distribution. In addition, the parity check bits generated by FEC 406 do not alter the desired shell distribution.

Returning to FIG. 6, demultiplexer 401 outputs first information bits to DM encoder 402 and second information bits to FEC encoder circuit 406, as noted above. As further described above, the first bits or "shell information bits" are used as the input to DM encoder 402 to map the first input bits of a fixed length k to a codeword of fixed length n with the desired distribution on the shell indices (each shell index identifying a respective shell). The shell indices fed to binary labeling circuitry or block 404, which generates a sequence of binary bits corresponding to the input shell indexes. If the number of shells is a complete power of 2 (e.g., all square QAM constellations of size a power of 2), binary labeling block 404 may be simplified to include circuitry that converts decimal number to binary form. The shell bits output from labeling block 404 and the second information bits output from demultiplexer 401, "index/sign information bits", are both fed to a systematic FEC encoder 406, and based on these inputs, FEC encoder circuit 406 generates parity check bits ("parity bits"). The addressing of the constellation points is performed in the following steps:

As further shown in FIG. 6, the codeword output from DM encoder 402 is also supplied to circuit block 405, which outputs bits that identify a selected shell (or shell index), such bits may correspond, for example, to bits in locations 1 and 3 of the labels shown in FIG. 2 discussed above.

Circuit block 407 receives the output from circuit block 405, parity bits output from FEC encoder 406, and index/sign information bits from demultiplexer 401. Based on an appropriate number of parity bits Index/sign info. bits", circuit block 407 generates bits that designate a unique constellation point within the selected shell. The combination of shell index bits and the bits designating the constellation point within each shell are output from circuit block 407 in the form of components XI and XQ of a complex number in the form XI+jXQ representing a particular symbol.

The percentages of the input information bits that are shell information bits (first bits output from demultiplexer 401) and index/sign information bits (second bits output from demultiplexer 401) are determined by the length of the DM codeword, desired spectral efficiency, the size of the template constellation, and the percentage of FEC overhead. In one example, 80% of the information bits may constitute shell information bits and 20% of the information bits may constitute index/sign information bits. To match the desired FEC overhead and to preserve the distribution through FEC, extra information bits plus parity bits from the FEC may be used by circuit block 407 to select the constellation points within a selected shell to thereby select constellation points according to the desired probability distribution.

It is noted that encoder block 304 shown in FIG. 6 has the same or similar structure as encoder 302 but provides in-phase (YI) and quadrature (YQ) components for modulating the Y (or transverse magnetic—TM) component of the transmitted optical signal.

Returning to FIG. 5, outputs XI and XQ are provided to pulse shaping, upsampling, and precompensation circuitry 306, which in turn, supplies outputs to digital to analog converters (DACs) 310 and 312. Similarly, outputs Yi and YQ are provided to pulse shaping, upsampling, and precompensation circuitry 308, which similarly supplies outputs to DACs 314 and 316.

As further shown in FIG. 5, DACs 310/312 and 314/316 output corresponding analog signals, which are filtered by low-pass or roofing filters (not shown) to thereby remove, block or substantially attenuate higher frequency components in these analog signals. Such high frequency components or harmonics are associated with sampling performed by DACs 310/312, 314/316 and are attributable to known "aliasing." The filtered analog signals may next be fed to corresponding driver circuits 326/328 and 332/330, which supply modulator driver signals that have a desired current and/or voltage for driving modulators present in PIC 206 (or provided as discrete devices) to provide modulated optical signals having the symbol probability distributions noted above.

Figure 7:
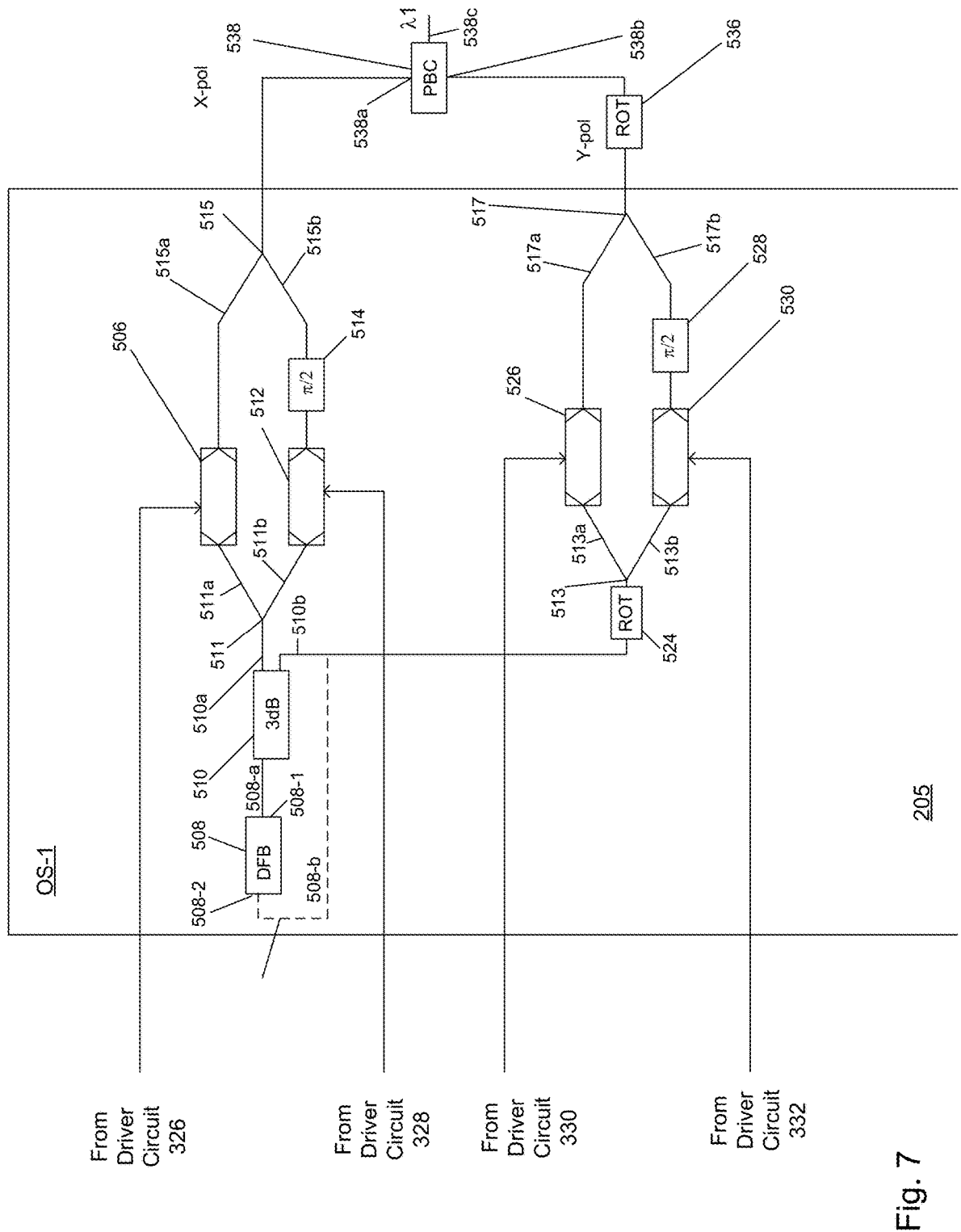
FIG. 7 illustrates a portion of transmitter consistent with the present disclosure.

Optical source OS-1 on PIC 206 will next be described with reference to FIG. 7. It is understood that remaining optical sources OS-1 to OS-n have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength λ1 to a dual output splitter or coupler 510 (e.g. a 3 db coupler) having an input port and first and second output ports. Typically, the waveguides used to connect the various components of optical source OS-1 may be polarization dependent. A first output 510a of coupler 510 supplies the CW light to first branching unit 511 and the second output 510b supplies the CW light to second branching unit 513. A first output 511a of branching unit 511 is coupled to modulator 506 and a second output 511b is coupled to modulator 512. Similarly, first output 513a is coupled to modulator 526 and second output 513b is coupled to modulator 530. Modulators 506, 512, 526 and 530 may be, for example, Mach Zehnder (MZ) modulators. Each of the MZ modulators receives CW light from DFB 508 and splits the light between two (2) arms or paths. An applied electric field in one or both paths of a MZ modulator creates a change in the refractive index to induce phase and/or amplitude modulation to light passing through the modulator. Each of the MZ modulators 506, 512, 526 and 530, which collectively can constitute a nested modulator, are driven with data signals or drive signals supplied via driver circuits 326, 328, 330, and 332, respectively. The CW light supplied to MZ modulator 506 via DFB 508 and branching unit 511 is modulated in accordance with the drive signal supplied by driver circuit 326. The modulated optical signal from MZ modulator 506 is supplied to first input 515a of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 328. The modulated optical signal from MZ modulator 512 is supplied to phase shifter 514 which shifts the phase of the signal 90° (π/2) to generate one of an in-phase (I) or quadrature (Q) components, which is supplied to second input 515b of branching unit 515. The modulated data signals from MZ modulator 506, which include the remaining one of the I and Q components, and the modulated data signals from MZ modulator 512, are supplied to polarization beam combiner (PBC) 538 via branching unit 515.

Modulators 506, 512, 526, and 530 may be individually or collectively referred to here in as a "modulator".

Modulator driver 330 supplies a third drive signal for driving MZ modulator 526. MZ modulator 526, in turn, outputs a modulated optical signal as either the I component or the Q component. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 508 is rotated by polarization rotator 524 and is supplied to MZ modulator 526 via first output 513a of branching unit 513. MZ modulator 526 then modulates the polarization rotated CW light supplied by DFB 508, in accordance with drive signals from driver circuit 330. The modulated optical signal from MZ modulator 526 is supplied to first input 517a of branching unit 517.

A fourth drive signal is supplied by driver 332 for driving MZ modulator 530. The CW light supplied from DFB 508 is also rotated by polarization rotator 524 and is supplied to MZ modulator 530 via second output 513b of branching unit 513. MZ modulator 530 then modulates the received optical signal in accordance with the drive signal supplied by driver 432. The modulated data signal from MZ modulator 530 is supplied to phase shifter 528 which shifts the phase the incoming signal 90° (π/2) and supplies the other of the I and Q components to second input 517b of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538a of polarization beam combiner (PBC) 538. The modulated data signal from MZ modulator 530 is supplied to second input port 538b of polarization beam combiner (PBC) 538. PBC 538 combines the four modulated optical signals from branching units 515 and 517 and outputs a multiplexed optical signal having wavelength λ1 to output port 538c. In this manner, one DFB laser 508 may provide a CW signal to four separate MZ modulators 506, 512, 526 and 530 for modulating at least four separate optical channels by utilizing phase shifting and polarization rotation of the transmission signals. Although rotator 536 and PBC 538 are shown on the PIC, it is understood that these devices may instead be provided off-PIC.

In another example, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508a of DFB 508 supplies CW light to branching unit 511 connected to MZ modulators 506 and 512. The back facet or second output 508b of DFB 508 supplies CW light to branching unit 513 connected to MZ modulators 526 and 530 via path or waveguide 543 (represented as a dashed line in FIG. 5a). The dual output configuration provides sufficient power to the respective MZ modulators at a power loss far less than that experienced through 3 dB coupler 510. The CW light supplied from second output 508b is supplied to waveguide 543 which is either coupled directly to branching unit 513 or to polarization rotator 524 disposed between DFB 508 and branching unit 513. Polarization rotator 524 rotates the polarization of CW light supplied from second output 508b of DFB 508 and supplies the rotated light to MZ modulator 526 via first output 513a of branching unit 513 and to MZ modulator 530 via second output 513b of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508b of DFB 508 before modulation.

As further noted above, the modulated optical signals output from each of modulators 506, 512, 526, and 530 carry modulation symbols that are carried by the modulated optical signals in accordance with a transmission probability distribution in accordance with symbols corresponding to selected shells and constellation points within each shell. Each of the modulated optical signals, therefore, may have a desired SE.

Moreover, the transmission probability distribution is based on the distribution of shells or amplitudes output from circuit 405. Accordingly, first symbols having a first amplitude (e.g., symbols represented by points 1+1i and −1+1i in FIG. 1 having a smaller amplitude or distance from the origin in the complex plane) are transmitted more frequently than second symbols having a second amplitude (e.g., symbols represented by points 3+3I and −3+3i having a greater amplitude or distance form the origin in the complex plane).

As noted above, optical signals output from transmitter block 12-1 are combined with optical signals output from remaining transmitter blocks 12-2 to 12-$n$ onto optical communication path 16 and transmitted to receive node 18 (see FIG. 1). In receive node 18, demultiplexer 20 divides the incoming signals into optical signal groupings, such that each grouping is fed to a corresponding one of receiver blocks 22-1 to 22-$n$.

Figure 8:
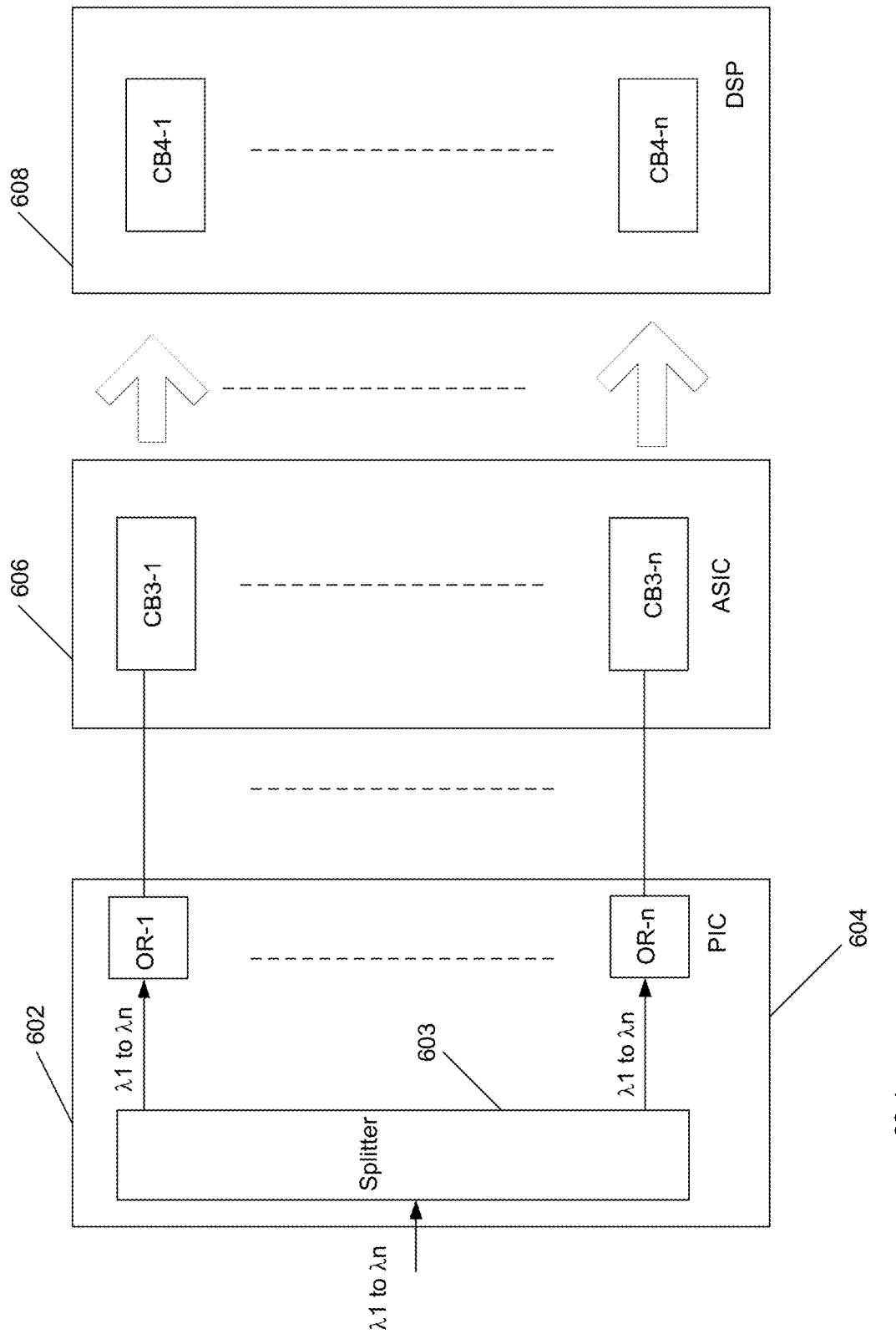
FIG. 8 illustrates a block diagram of a receiver block consistent with an aspect of the present disclosure.

One of receiver blocks 22-1 is shown in greater detail in FIG. 8. It is understood that remaining receiver circuitry or blocks 22-2 to 22-$n$ have the same or similar structure as receiver block 22-1.

Receiver block 22-1 includes a receive PIC 602 provided on substrate 604. PIC 602 includes an optical power splitter 603 that receives optical signals having wavelengths $\lambda 1$ to $\lambda 10$, for example, and supplies a power split portion of each optical signal (each of which itself may be considered an optical signal) to each of optical receivers OR-1 to OR-n. Each optical receiver OR-1 to OR-n, in turn, supplies a corresponding output to a respective one of circuit blocks CB3-1 to CB3-$n$ of ASIC 606, and each of circuit blocks CB3-1 to CB3-$n$, supplies a respective output to a corresponding one of circuit blocks CB4-1 to CB4-$n$ of DSP 608. DSP 608, in turn, outputs a copy of data Data-1 in response to the input to circuit blocks CB4-1 to CB4-$n$.

Figure 9:
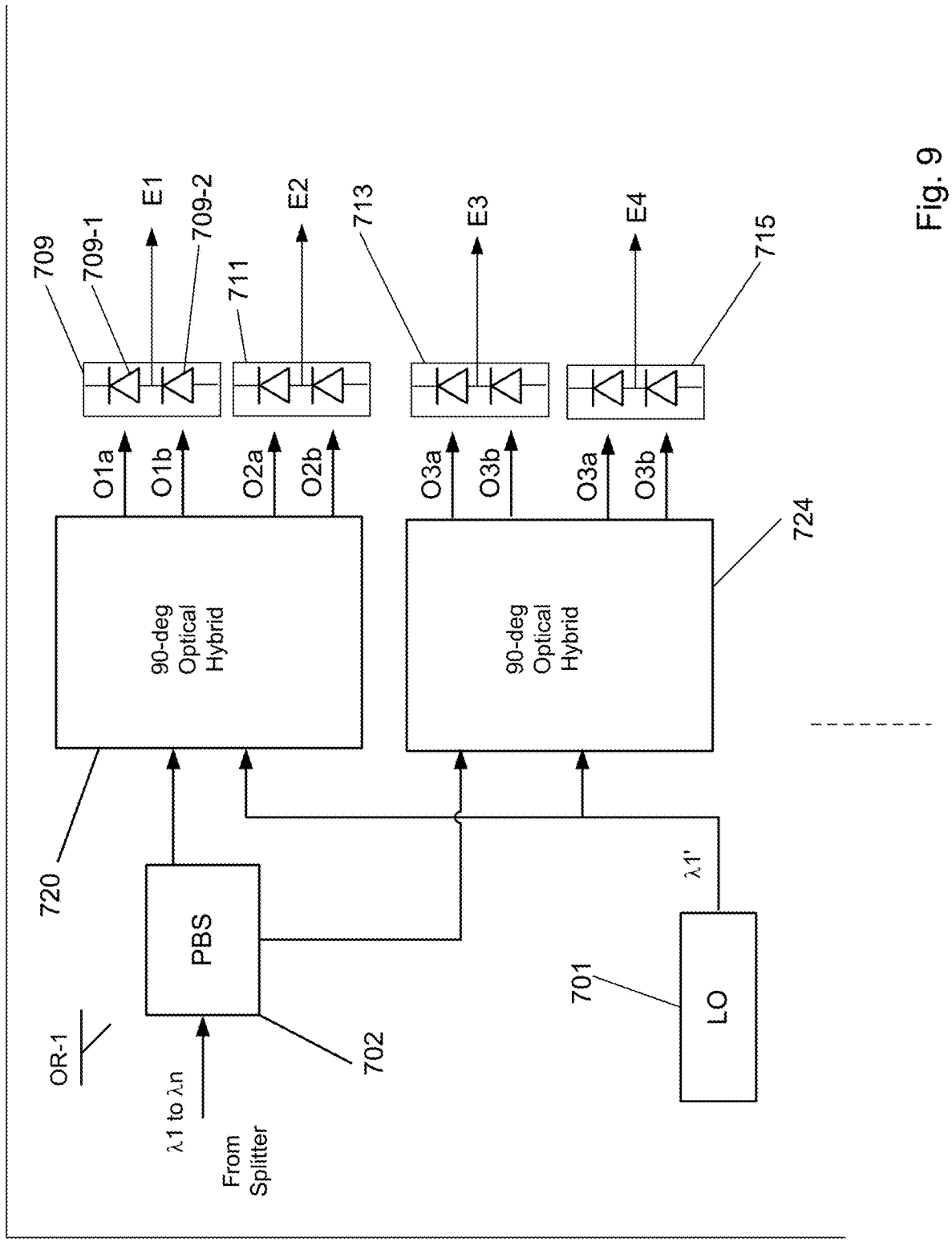
FIG. 9 illustrates a portion of a receiver consistent with the present disclosure.

Optical receiver OR-1 is shown in greater detail in FIG. 9. It is understood that remaining optical receivers OR-2 to OR-n have the same or similar structure as optical receiver OR-1. Optical receiver OR-1 may include a polarization beam splitter (PBS) 702, which may be provided on or off substrate 604 operable to receive polarization multiplexed optical signals $\lambda 1$ to $\lambda 10$ and to separate the signal into X and Y orthogonal polarizations, i.e., vector components of the optical E-field of the incoming optical signals transmitted on optical communication path 16. The orthogonal polarizations are then mixed in 90-degree optical hybrid circuits ("hybrids") 720 and 724 with light from local oscillator (LO) laser 701 having wavelength $\lambda 1$ or a wavelength that differs slight from wavelength $\lambda 1$ so that the incoming light "beats" with the local oscillator light. Hybrid circuit 720 outputs four optical signals O1$a$, O1$b$, O2$a$, O2$b$ and hybrid circuit 724 outputs four optical signals O3$a$, O3$b$, O4$a$, and O4$b$, each representing the in-phase and quadrature components of the optical E-field on X (TE) and Y (TM) polarizations, and each including light from local oscillator 701 and light from polarization beam splitter 702. Optical signals O1$a$, O1$b$, O2$a$, O2$b$, O3$a$, O3$b$, O4$a$, and O4$b$ are supplied to a respective one of photodetector circuits 709, 711, 713, and 715. Each photodetector circuit, for example, may include a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals $\lambda 1$ to $\lambda 10$ input to PBS 702 demodulated with LO 701 ($\lambda 1$). For example, these electrical signals may comprise four base-band analog electrical signals linearly proportional to the in-phase and quadrature components of the optical E-field on X and Y polarizations.

It is noted that the components and devices in the Tx and Rx PICs discussed above may be provided as discrete devices, or selected devices discussed above may be integrated or not integrated with other devices.

Figure 10:
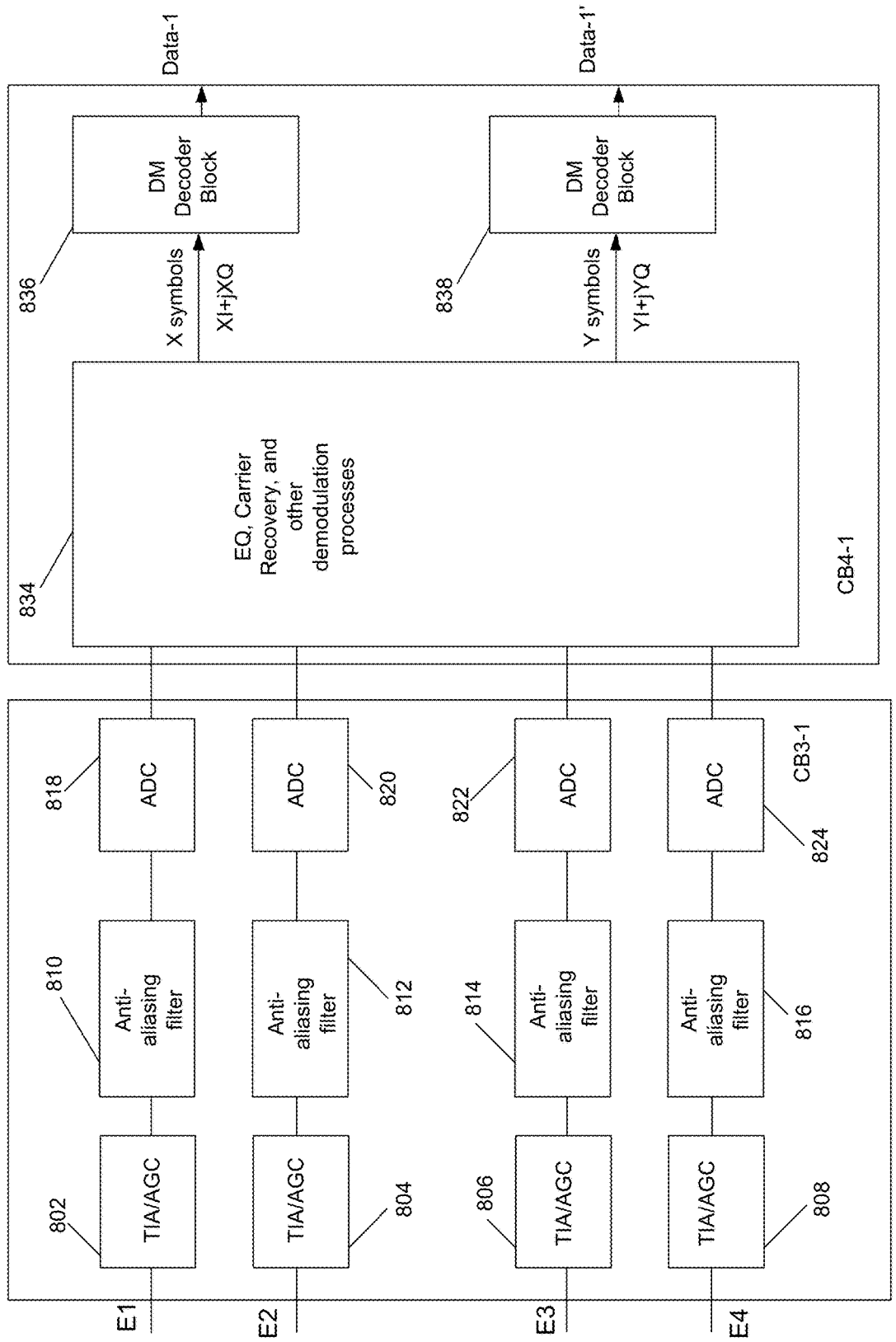
FIG. 10 illustrates a portion of the receive block shown in FIG. 6.

FIG. 10 shows circuitry or circuit blocks CB3-1 and CB4-1 in greater detail. It is understood that remaining circuit blocks CB3-2 to CB3-$n$ of ASIC 606 have a similar structure and operate in a similar manner as circuit block CB3-1. In addition, it is understood that remaining circuit blocks CB4-2 to CB4-$n$ of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Each of circuitry 802, 804, 806, and 808, in turn, supplies corresponding electrical signals or outputs to respective ones of anti-aliasing filters 810, 812, 814, and 816, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate, as described in greater detail in U.S. Pat. No. 8,477,056, the entire contents of which are incorporated herein by reference.

As further shown in FIG. 10, digital outputs of ADCs 818, 820, 822, and 824 are supplied to circuit block 834, which may carry out equalization, carrier recovery, and other demodulation processing on such ADC outputs to provide outputs XI, XQ, Yi, and YQ corresponding to XI, XQ, YI, and YQ discussed above in connection with FIGS. 5 and 6 above. Outputs XI and XQ are provided to decoder block 836, and YI, and YQ are provided to DM decoder block 838 (see FIG. 8).

Figure 11:
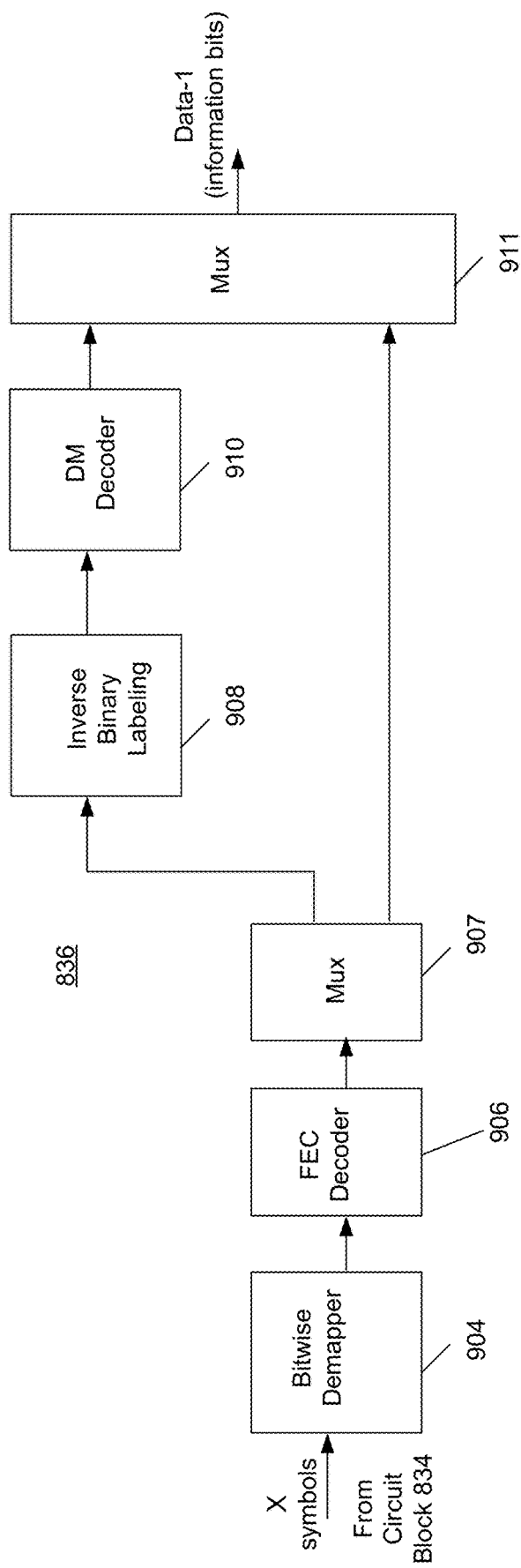
FIG. 11 illustrates a decoder circuit consistent with an additional aspect of the present disclosure.

FIG. 11 shows decoder block 836 in greater detail. It is understood that decoder block 838 has the same or similar structure as decoder block 836. In addition, decoder block 838 operates in the same or similar manner as decoder block 836.

Decoder block 836 may include a bitwise demapper circuit 904 (discussed in greater detail below) that outputs bits corresponding to the symbols output from circuit block 834. The bits output from circuit 904 are fed to an FEC decoder, which decodes such bits in accordance with a soft FEC decoding process or a hard FEC decoding process. In one example, if the symbols conform to a 16 QAM modulation format and soft FEC is employed, bitwise demapper 904 may output four values, each being a confidence level associated with a respective bit of a label index. The confidence levels may be used by decoder 906 (if soft FEC is employed in decoder 906) to generate four bit value in this example, although different modulation formats may result in few or more confidence values being input to and bit output from FEC decoder circuit 906. The outputs of FEC decoder 906 may be supplied to a multiplexer circuit 907 that supplies first or shell bits to an inverse binary labeling circuit 908 that performs that inverse of the binary labeling circuit noted above to provide the shell indices. The bits (shell indices) output from circuit 908 are fed to DM decoder circuit 910, which, in turn provides shell information bits corresponding to the first bits output from demultiplexer circuit 401 discussed above in connection with FIG. 6. The shell information bits are fed as an input to multiplexer 911.

As further shown in FIG. 11, demultiplexer 907 also supplies second bits that may be provided directly to multiplexer 911. The second bits output from demultiplexer 907 correspond to the index/signal information bits noted above in connection with FIG. 6. Based on the first and second bit inputs, multiplexer 911 outputs information bits corresponding to information bits (Data-1) input to demultiplexer 401 shown in FIG. 6.

Bitwise demapping, as carried out in circuit 904, will next be described in further detail. Although a joint or 2-D (two-dimensional) encoding of I and Q dimensions DM encoding is carried out at the transmit side, the suggested gray code labeling noted above allows for independent (one dimensional I and Q channel processing at the decoder side. The bitwise demapping of the received symbols may be related to one in bit interleaved coded modulation (BICM). However, the a priory probability (APP) of the received symbols may be taken into account. Namely, assuming x is the transmitted symbol and y is the received symbol in either I or Q dimension. Each real symbol is addressed by a binary label of length m. For a 16 QAM constellation, m=2. The log likelihood ratio (LLR) for the i-th bit, $b_i$, i=1, . . . , m, may be calculated as follows.

$$L_i = \log \frac{p(b_i = 0 \mid y)}{p(b_i = 1 \mid y)}$$

$$= \log \frac{p(y \mid b_i = 0)p(b_i = 0)}{p(y \mid b_i = 1)p(b_i = 1)}$$

$$= \log \frac{\sum_x p(x, y \mid b_i = 0)p(b_i = 0)}{\sum_x p(x, y \mid b_i = 1)p(b_i = 1)}$$

$$= \log \frac{\sum_x p(y \mid x, b_i = 0)p(x)p(b_i = 0)}{\sum_x p(y \mid x, b_i = 1)p(x)p(b_i = 1)}$$

$$\cong \max_{x:b_i=0} \log p(x)p(y \mid x)p(b_i = 0) - \max_{x:b_i=1} \log p(x)p(y \mid x)p(b_i = 1)$$

==≅$b_i$ represents the i-th bit in the binary label of symbol x. In case $p(b_i=0)=p(b_i=1)$, these terms can be cancelled out from the calculations. The approximate LLR calculation for sign bits is independent of the probability distribution of the symbols. The received signal value itself (in each dimension) may be approximated as the sign bit LLR depending on the bit width size of the signal and the calculated LLR. To simplify the bitwise demapping for the rest of the bits, the symmetry of the constellation and the labeling with respect to the origin may be taken into account. In this case, the absolute value of the received signals is used only on the positive side of the real dimension, and the total number of real constellation points that need to be considered for LLR calculation becomes a half of the size of the original constellation on each real dimension. The LLR corresponds to the confidence values noted above that are output from bitwise demapper 904.

Figure 12:
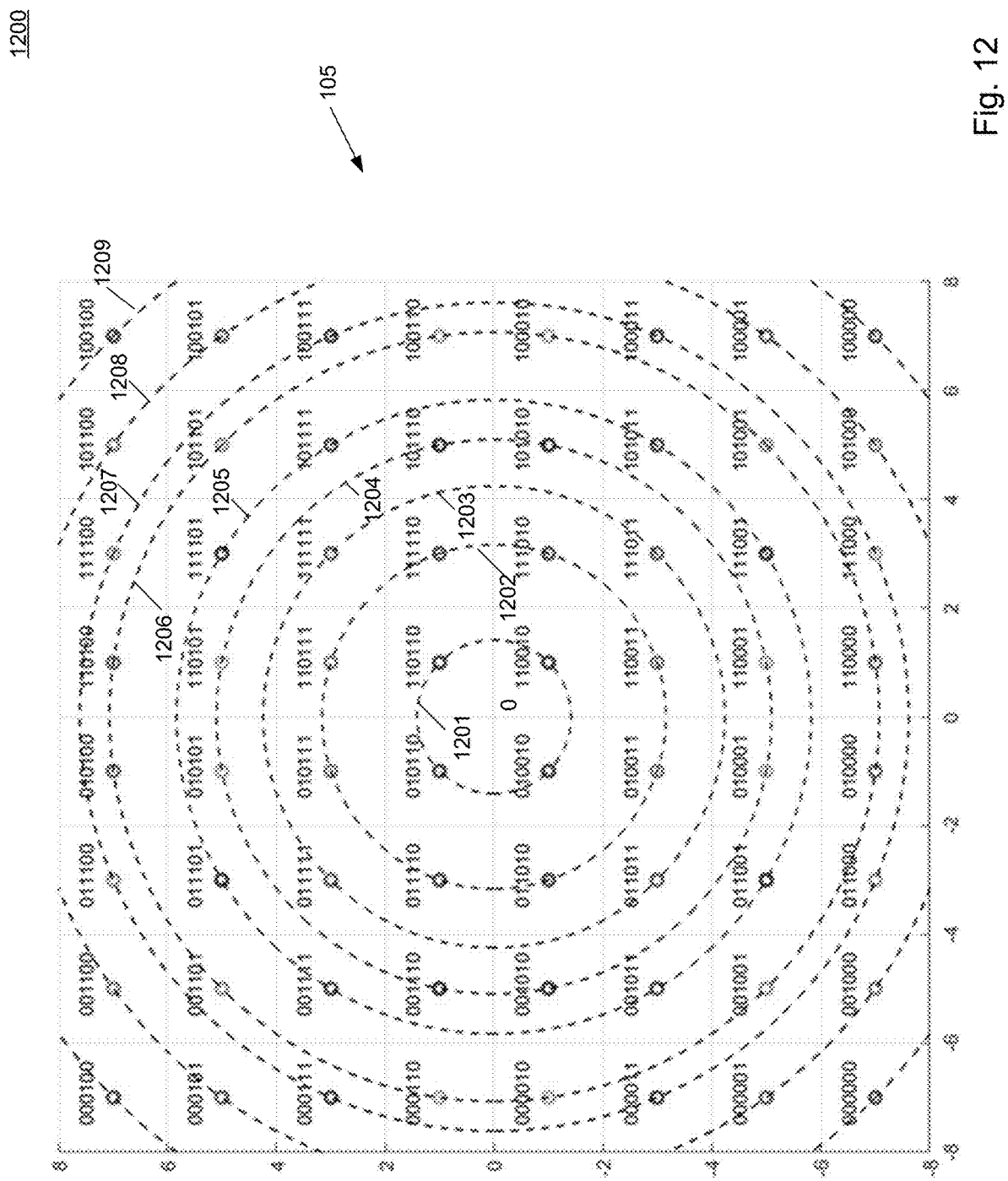
FIG. 12 illustrates a constellation consistent with an aspect of the present disclosure.

Although DM or PCS has been described above in connection with shell mapping of 16 QAM constellations, the present disclosure is not limited to such square constellations. Generally, other square constellations are also considered within the scope of the present disclosure. For example, the above described techniques and circuitry may be employed in connection with 64 QAM constellations where the constellation points are located on 9 energy levels as constellation 1200 shown in FIG. 12. This example constellation includes 9 energy levels 1201-1209. Numbering from the most inner energy level, 1201, there are 8 constellations points on levels 1202, 1203, 1205, 1207, and 1208. The constellation points at these energy levels can be further partitioned to two disjoint subsets or shells, each of which include four points, such as a shell at energy level 1202 including points with labels 111110, 011110, 011010, and 111010, and a second shell at energy level 1202 including points with labels 11011, 010111, 010011, and 110011. There are also 12 constellation points on energy level 1206, which can be partitioned into three disjoint subsets or shells, each of which including four points: first shell, points with labels 101101, 001101, 001001, 101001; second shell, points with labels 110100, 010100, 010000, and 110000; and third shell, points with labels 100110, 000110, 000010, and 100010. In all, constellation 1200 includes 16 disjoint sets or subshells. Although a specific labeling scheme is described above, shells may be labeled in accordance with other schemes. Any partitioning and/or labeling scheme which allows for independent I and Q channel processing for bitwise demapping serves may be employed.

As noted above, constellation points are partitioned such that each quadrant of the complex plan has one (or a complete power of 2) point of the shell, such that each shell has four constellation points. Table 1300 in FIG. 13 shows an example of partitioning that allows binary gray coding for labeling of the 64 QAM constellation 1200. In each label, taken from left to right bits, bit positions 0 and 3 are the sign bits for I and the Q dimensions. Bit positions 1, 2, 4, and 5 are common or the same for each point within a given shell and represent the index of the corresponding shell. Encoding to generate symbols is similar to or the same as that described above in connection with FIG. 6. In addition, bitwise demapping, as described above, may be applied to the I and Q dimensions associated with constellation 1200. To simplify the LLR or confidence level calculation discussed above in connection with bitwise demapping (circuit block 904), the absolute value of the received signal may considered in calculating the LLR of the shell bits.

Although PCS schemes have been described above in connection with square constellations, the present disclosure may also be applicable to non-square constellations and constellations that do not conform to a Cartesian grid. Although independent I and Q channel processing at the bitwise demapping stage may not be possible with such non-square constellations, the present disclosure advantageously affords the capability to choose the most suitable size and the most suitable shape constellation for a specific spectral efficiency. That is, using large size constellations to provide small spectral efficiencies results in high peak to average power ratio which may not be desirable in many communication scenarios. For example, instead of having 16/64/256/1024/ . . . QAM constellations, consistent with the present disclosure, PCS may be applied to any constellation having a number of points equal to multiple of four (e.g., 8/12/16/20/24/28/32/ . . . ). Moreover, as noted above, the constellation points need not conform to a Cartesian grid.

Figure 14B:
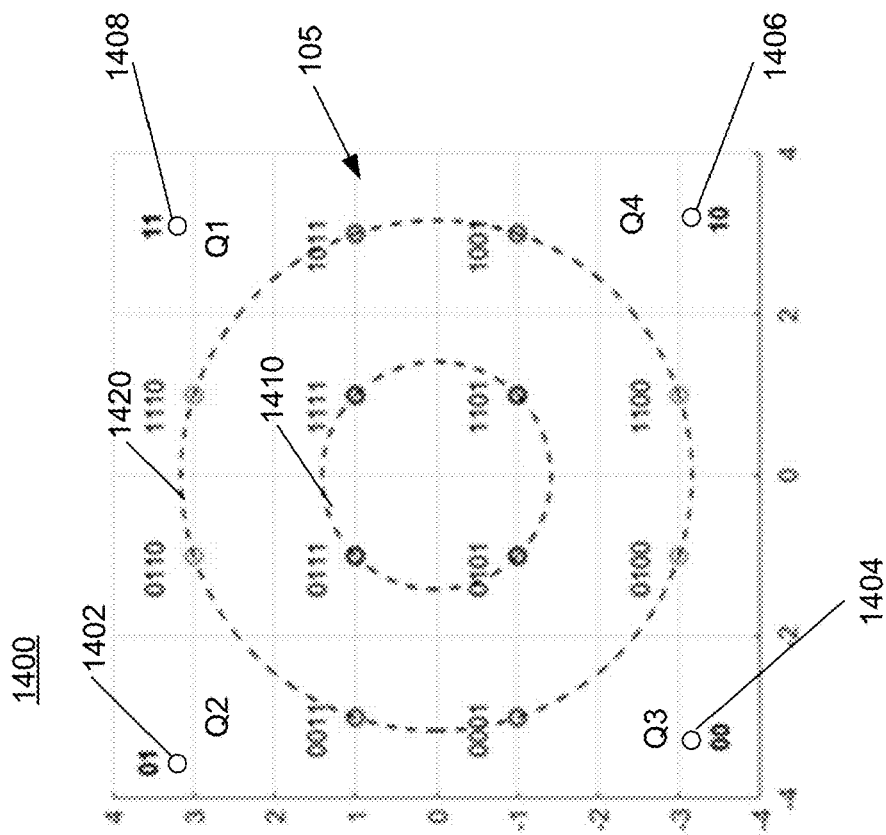
FIGS. 14a-14c illustrate examples of non-square or non-Cartesian constellations consistent with an aspect of the present disclosure.

By way of example, PCS and shell mapping in connection with a non-square constellation, such as the 12 QAM constellation shown in FIGS. 14a and 14b will next be described. Here, the above-described modulators 506, 512, 526 and 530 (collectively, these modulators may be considered a modulator) are driven by drive signals provided by circuitry described above, such that based on the drive signal, the modulator supplies a modulated optical signal, which carries symbols in accordance with a predetermined transmission probability, as noted above. The plurality of symbols corresponds to constellation points on complex plane 105, the constellation points being arranged in a non-square configuration or constellation, as shown in FIGS. 14*a* and 14*b* or in a non-Cartesian configuration or constellation as shown in FIG. 14*c*.

Although the 12 QAM constellation conforms to a Cartesian grid, it is understood that the geometrical distribution of the points can be further optimized, in accordance with the devices and techniques disclosed herein, to be non-Cartesian to improve the final performance. An example of a non-Cartesian grid is shown in FIG. 14*c*, whereby selected points, such as the point labeled (1+sqrt 3 ($\sqrt{3}$), 0), are provided on a non-uniform grid.

Figure 14A:
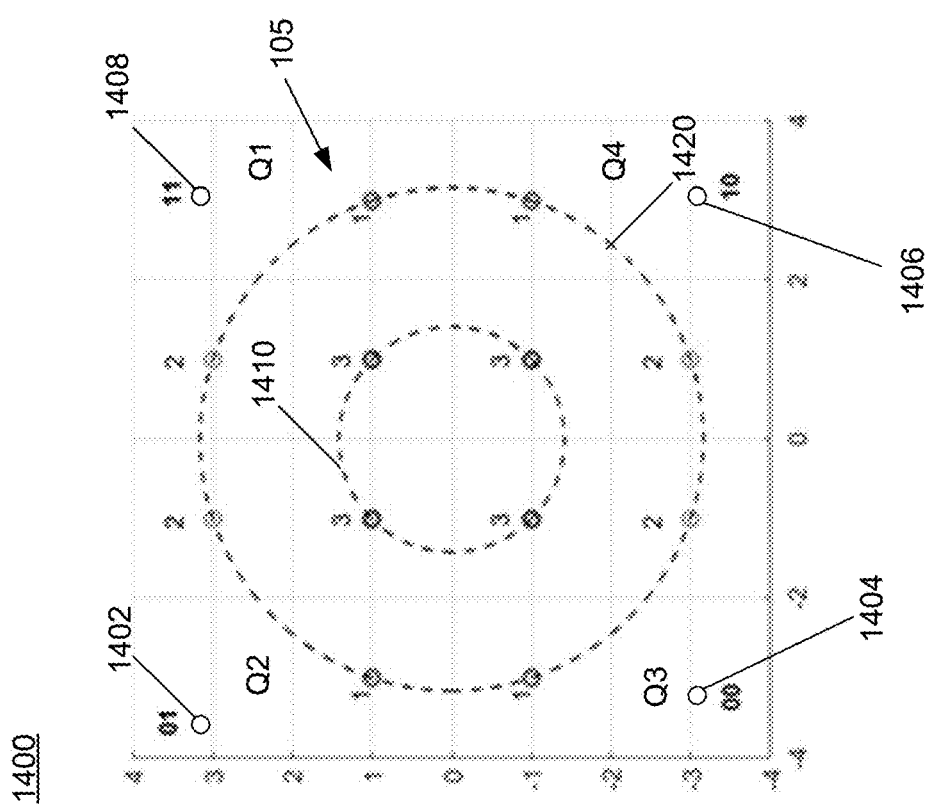
Figure 14C:
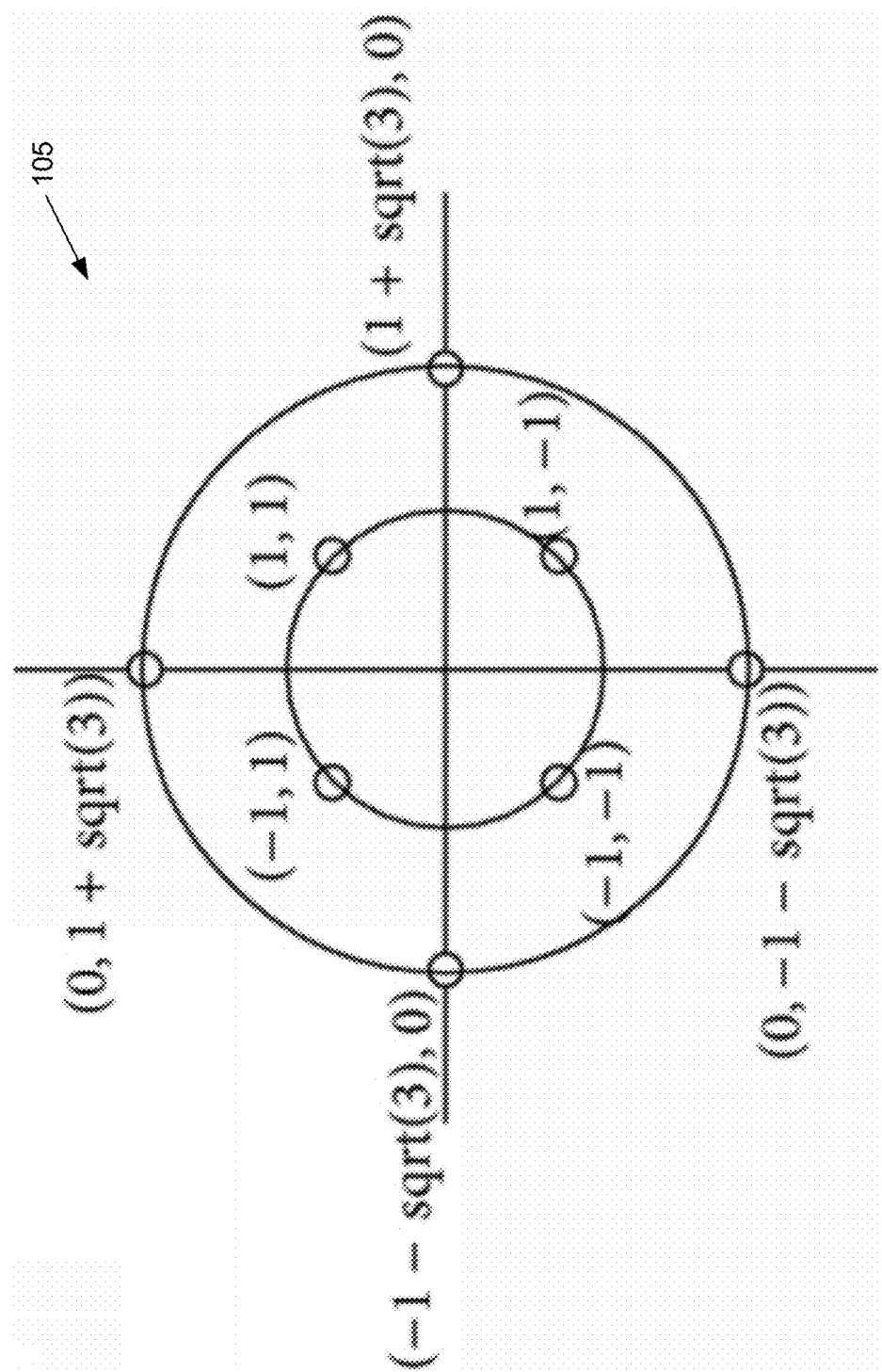

FIG. 14*a* shows 12 QAM constellation 1400 with constellation points partitioned and identified according to shell index 1, 2, and 3. The partitioning procedure is similar to that described above for square constellations. Each shell may have only one (or a complete power of 2) point in each quadrant Q1, Q2, Q3, and Q4. FIG. 14*b* shows 12 QAM constellation 1400 with each constellation point designated by a respective label, as described above.

The simplest way to label the points of a non-square constellation is to replace each shell index with a respective binary value. In that case, the constellation may be addressed by four bit binary gray codes (gray labelling) in which the bits at the first and the third locations of each label represent the sign bits on I and Q dimensions respectively, as discussed above. The second and the forth bit locations are the binary representation of the shell indexes, as further noted above. Table 1500 of FIG. 14*b* illustrates the 4-bit gray labeling for 12 QAM. Here, the probabilities of a bit being zero or one are not identical as four of the labels, represented by empty circles 1402, 1404, 1406, and 1408, remain unused. Such information may be treated as a priory information in bitwise demapping.

Although decimal to binary labeling is simple, it is not efficient, as the 12 points of 12 QAM constellation 1400 is addressed by four bits. Thus, not all 16 bit combinations of such four bits are utilized to address each point of the constellation. An alternative approach, consistent with an aspect of the present disclosure, is to group multiple (possibly consecutive) shell indices and label shell groups by a binary sequence of larger size (group labeling). For example, if every three shell indices are grouped together, there are a total number of 27 possible combinations ($3^3=27$) which can be addressed by 5 bits. In this case one bit is saved for every three shell indexes. Since not all 32 ($2^5=32$) labels are used by the shell combinations, the probabilities of a bit being zero or one are not identical. Such information may be used as a priory information in bitwise demapping. Table 1500 in FIG. 15 shows a labeling for addressing the 27 shell combinations. Such labeling may be optimized to minimize the bit error rate performance.

Bit-to-symbol mapping may be achieved in a manner similar to that described above, for example, in connection with FIGS. 1, 2, and 6. At the input to the FEC encoder, such as FEC encoder 406, the "shell bits" output from binary labeling block (e.g., block 404) and the "Index/sign information bits" are protected by parity bits generated by FEC encoder 406, as noted above. The sequence of shell indices and the bits from "index/sign info. bits" and parity bits are used to address the constellation points within each shell.

In the case that constellation points are addressed with gray-coded labels, the same or similar bitwise demapping discussed above in connection with square constellations may be deployed. However, joint I and Q processing may be required for soft FEC decoding of shell bits. Accordingly, as noted above, the symmetry of the constellation points with respect to the horizontal and vertical axes of the constellation plane may be used to demap the shell bits by considering positive quadrant and the absolute value of the received signal in each I and Q dimension. The LLR calculation for sign bits can be performed separately on I and Q dimensions, as further noted above.

When the above-described group labeling is employed in connection with non-square or non-Cartesian constellations, the soft demapping of shell bits may require that different combinations of symbols be considered according to the shell combinations. For the cases that the constellation and the labeling are symmetric with respect to the horizontal and vertical axis of the constellation plan, the absolute value of the received signal may be considered, as well as the positive quadrant. Calculation of the LLR (confidence level input to the soft FEC decoder 906, FIG. 11) for the shell bits will now be discussed in greater detail.

Assuming that $x_0, x_1, x_2$ are three consecutive transmitted symbols and $y_0, y_1, y_2$ are the corresponding received symbols, the LLR calculation for the i-th shell bit is given as follows:

$$L_i = \log\frac{p(b_i = 0 \mid y_1, y_2, y_3)}{p(b_i = 1 \mid y_1, y_2, y_3)}$$

$$= \log\frac{p(y_1, y_2, y_3 \mid b_i = 0)p(b_i = 0)}{p(y_1, y_2, y_3 \mid b_i = 1)p(b_i = 1)}$$

$$= \log\frac{\sum_{(x_1,x_2,x_3)} p(x_1, x_2, x_3, y_1, y_2, y_3 \mid b_i = 0)p(b_i = 0)}{\sum_{(x_1,x_2,x_3)} p(x_1, x_2, x_3, y_1, y_2, y_3 \mid b_i = 1)p(b_i = 1)}$$

$$= \log\frac{\sum_{(x_1,x_2,x_3)} p\binom{y_1, y_2, y_3 \mid x_1, x_2,}{x_3, b_i = 0} p(x_1, x_2, x_3 \mid b_i = 0)p(b_i = 0)}{\sum_{(x_1,x_2,x_3)} p\binom{y_1, y_2, y_3 \mid x_1, x_2,}{x_3, b_i = 1} p(x_1, x_2, x_3 \mid b_i = 1)p(b_i = 1)}$$

$$= \log\frac{\sum_{(x_1,x_2,x_3):b_i=0} p(y_1, y_2, y_3 \mid x_1, x_2, x_3)p(x_1, x_2, x_3)p(b_i = 0)}{\sum_{(x_1,x_2,x_3):b_i=1} p(y_1, y_2, y_3 \mid x_1, x_2, x_3)p(x_1, x_2, x_3)p(b_i = 1)}$$

$$\cong \max_{(x_1,x_2,x_3):b_i=0} \log p(y_1, y_2, y_3 \mid x_1, x_2, x_3)p(x_1, x_2, x_3)p(b_i = 0) -$$

$$\max_{(x_1,x_2,x_3):b_i=0} \log p(y_1, y_2, y_3 \mid x_1, x_2, x_3)p(x_1, x_2, x_3)p(b_i = 1)$$

The summation is over all the shell combinations in table 1500 in which the i-th bit in the binary label is either $b_i=0$ or $b_1=1$. If the absolute value of the received signal is considered, only a fourth of the constellation points in the positive quadrant are considered in the LLR calculation. As the transmitted symbols are independent from each other and the underlying channel is assumed to be a memory-less medium, the joint probability of the symbols can further be simplified to multiplication of the individual probabilities. Similarly, the conditional joint probabilities of the received symbols given the transmitted symbols can further be simplified to multiplication of the individual conditional probability of each received symbol given the corresponding transmitted "1".

Returning to FIG. 6, the codewords output from DM encoder 402 may be constant modulus. That is, for any arbitrary distribution and for any arbitrary codeword length, the inner product of a codeword with its complex conjugate is a constant identical value for all codewords. Constant modulus is desirable in some communication scenarios such as transmission over optical fibers, whereby codewords conforming to constant modulus result in reduced fiber non-linearity effects by limiting the dynamic range of the amplitude variation in the time domain signal.

As noted above, DM block 402 in FIG. 6 generates the desired empirical amplitude distribution and creates a one-to-one mapping between the input information bit sequences and the codewords (see also the above noted U.S. patent application Ser. No. 16/152,353). In one example discussed in greater detail below, DM encoder block 402 (FIG. 6) and DM decoder block 910 (FIG. 11) may be replaced by lookup tables in which information bits are directly related to DM codewords. Using a lookup table in this manner may not be practical for long-length codewords as the size of the lookup table may become large. However, lookup tables may be employed for short length codewords to provide a less complex alternative to DM encoder 402 and DM decoder 910.

Use of lookup tables may provide the option of minimizing average power of the signal, if the constant modulus property is not required. In that case, the lookup tables may store shell index combinations that result in minimum average power of the transmitted symbols. The following example illustrates the construction of probabilistically shaped signals based on short length codewords using 12 QAM component constellation.

Figure 16A:
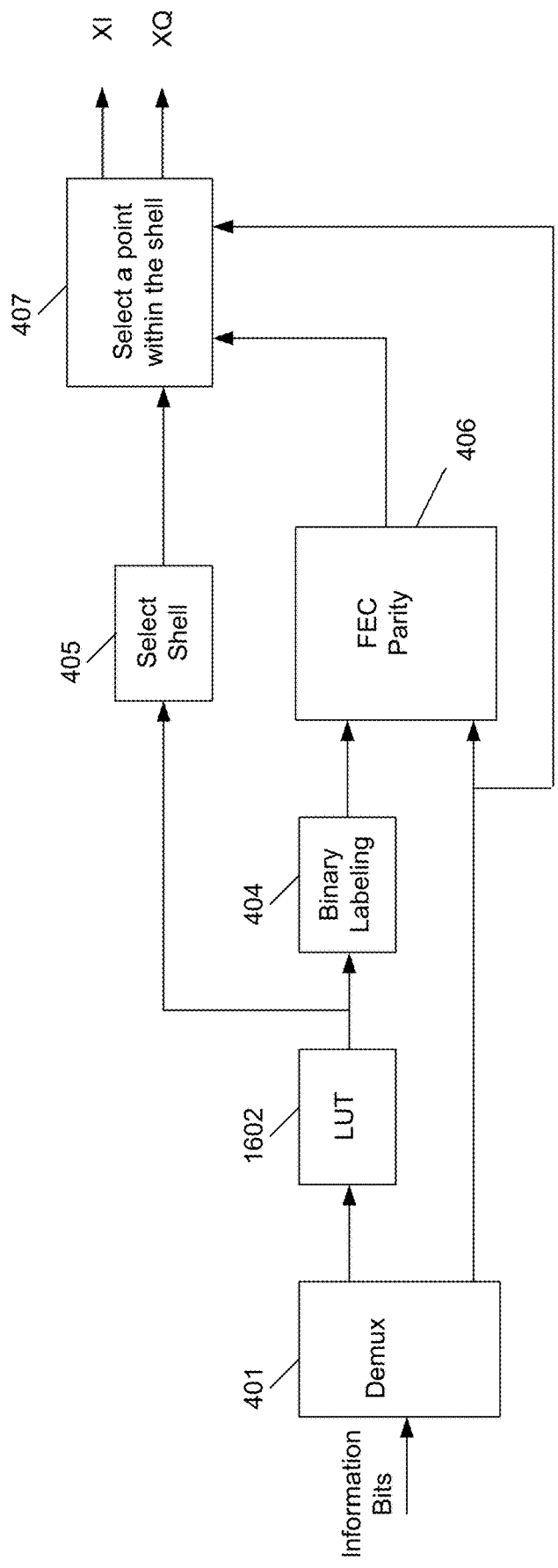
FIG. 16a shows an example of an encoder circuit consistent with an additional aspect of the present disclosure.

FIG. 16a illustrates an example of an encoder block 302-16 consistent with an aspect of the present disclosure. Encoder block 302-16 has the same or similar structure and operates in the same or similar manner as encoder block 302 discussed above, with the exception that DM encoder 402 is replaced by a memory circuit, such as lookup table 1602, such that first information bits output from demultiplexer circuit 401 are used to access shell indices or information stored in lookup table 1602. Based on such information, drive signals are generated that drive the above-described modulators to output a modulated optical signal carrying symbols in accordance with a predetermined transmission probability, as further noted above.

By way of example, operation of lookup table 1602 in connection with 12 QAM constellation 1400 discussed above will next be described. Further, in this example, constellation shaping with only two complex dimension expansion is desired. i.e., the length of the codewords is only two symbols. A list of all possible shell combinations over such two symbols may be stored in lookup table 1602 as shown in FIG. 16b. Assuming that the shells are indexed as shown in FIG. 14b, there are nine different shell combinations available over two complex dimensions, as further shown in FIG. 16b.

Thus, a shell mapping scheme based on a lookup table and consistent with the present disclosure involves the following steps:
 1—Create a list of shell combinations with a proper size for a desired spectral efficiency.
 2—Select one of the shell combinations using a proper number of bits.
 3—Corresponding to each entry of the selected shell combination, use two bits to address a unique constellation point within the selected shell.

By way of further example, the following spectral efficiencies may be obtained using lookup table 1602:
 SE=2 or 4 bits over 2 symbol intervals; if only one of the shell combinations is used. Thus, no additional bits are required to address the shell combinations as only one row of lookup table 1602 is accessed.
 SE=2.5 or 5 bits over 2 symbol intervals; if any two of the shell combinations are used. Thus, one extra bit is required to address the shell combinations (1 bit+2 bits associated with the first shell index (symbol)+2 bits associated with the second shell index (symbol)=5 bits). That is, in order to address two rows of lookup table 1602, an additional bit having a value of '0' or '1' may be required to select one of these two rows.
 SE=3 or 6 bits over 2 symbol intervals; if any four of the shell combinations are used. Thus, two extra bits ($2^2$=4) are required to address the four shell combinations (two bits+2 bits associated with the first shell index+2 bits associated with the second shell index=6 bits). In other words, in order to address four rows of lookup table 1602, two additional bits having values of 00, 01, 10, and 11 may be required to select one of these four rows.
 SE=3.5 or 7 bits over 2 symbol intervals; if any eight of the shell combinations are used. Thus, three bits ($2^3$=8) are required to address the shell combinations (3 bits+2 bits associated with the first shell index+2 bits associated with the second shell index=7 bits). In other words, in order to address eight rows of lookup table 1602, three additional bits having values of 000, 001, 010, 011, 100, 101, 110, and 111 may be required to select one of these eight rows.

To minimize the average energy for each spectral efficiency, shell combinations from the lower energy levels first, e.g., shell indices 1 and 2, may be selected. When the shell combination list is generated, the probability distribution of Table 1702 may be employed which contains the shell combination list for the above noted spectral efficiencies. The probability of occurrence of the shells for each spectral efficiency is also given in Table 1702 in FIG. 17a. As can be seen the signal set constellation points (symbols) have been probabilistically shaped to minimize the average power at a fixed minimum Euclidean distance.

To tailor the constellation for finer spectral efficiencies, the number of dimensions is preferably expanded. For example, to refine the spectral efficiencies with step size 0.25 (as opposed to a step size of 0.5 above), at least 4 complex dimension expansion is required. In this case, there are $3^4$=81 different shell combinations in total. All spectral efficiencies from 2 to 3.5 with the step size of 0.25 bits/symbol are achievable. For example, to achieve 2.75 spectral efficiency, it is sufficient to transmit 11 bits over 4 complex dimensions (symbol intervals). This can be performed by creating a list in lookup table 1602 including 8 shell combinations with minimum energy. Three bits may be required to select one shell combination out of 8, and two bits per each index may be required to address the constellation points within each shell. Altogether 11 bits is transmitted over four time intervals. Operation of the circuitry shown in FIG. 16a is otherwise similar to that shown in FIG. 6 to output symbols, and, based on these symbols, modulator drive signals are generated to drive the modulators discussed above to output a modulated optical signal carrying symbols in accordance with a predetermined transmission probability, whereby in the example disclosed herein, symbols having a smaller amplitude are transmitted more frequently than symbols with a greater amplitude.

Other partitioning schemes are contemplated herein. To optimize the bit error rate performance, the partitioning scheme and the labelling of the shell combinations are preferably optimized for each spectral efficiency. Moreover, the geometric distribution of the constellation points may be optimized to provide the best bit error rate performance for a specific probability distribution.

In addition, the shell combination list or the lookup table can be generated to fulfil additional constraints such as the constant modulus property. In this case, the resulting signal set or constellation points do not have the minimum average power among all possible signal sets. However, better performance may be achieved due to specific channel scenarios such as fiber optical channels with non-linearity effects. Table 1702 in FIG. 17a illustrates an example in connection with probabilistically shaped constant modulus signal sets on short length codewords using 12 QAM component constellation.

Table 1704 in FIG. 17b contains the shell combination list to generate a constant modulus signal set for SE=3 bits/symbol. Here, the average power of the signal set or constellation points is higher than the corresponding case in Table 1702. However, the signal set shown in Table 1704 results in a constant modules four dimensional (4D) real constellation that is more robust against fiber non-linearity effects that may be observed during transmission in many optical fibers.

Other embodiments will be apparent to those skilled in the art from consideration of the specification. It is intended that the specification and examples be considered as exemplary only, with a true scope and spirit of the invention being indicated by the following claims.

What is claimed is:

1. A communication method, comprising:
    receiving a codeword, selected first bits of the codeword designating an amplitude associated with a plurality of symbols, the plurality of symbols corresponding to points on a complex plane;
    generating a value based on the first bits, the value identifies the amplitude;
    generating a binary label based on second bits of the codeword;
    generating forward error correction encoded bits based on the codeword;
    selecting one of a plurality of symbols based on the value and the binary label and the forward error correction encoded bits;
    supplying an optical signal that carries information based on the selected one of the plurality of symbols.

2. A communication method in accordance with claim 1, further including:
    receiving said one of the plurality of symbols; and
    demapping said one of the plurality of symbols.

3. A method in accordance with claim 1, wherein the step of supplying an optical signal includes modulating light output from a laser.

4. A method comprising:
    generating a plurality of labels, each of which being based on a corresponding one of a plurality of combinations of amplitudes, each amplitude within one of the combinations of amplitudes being common to a corresponding one of a plurality of groups of points of a constellation, the constellation being on a complex plane;
    receiving a codeword, bits of the codeword selecting one of the plurality of labels;
    generating forward error correction encoded bits based on the codeword;
    generate a symbol based on a selected one of q plurality of symbol shells and the forward error correction encoded bits; and
    generating a modulated optical signal that carries information indicative of the generated symbol based on selected one of the plurality of symbol shells.

5. A method in accordance with claim 4, wherein the constellation is associated with a 16, 64, 256, or 1024 quadrature amplitude modulation (QAM) modulation format.

* * * * *